(12) United States Patent
Uematsu

(10) Patent No.: US 7,274,514 B2
(45) Date of Patent: Sep. 25, 2007

(54) ELECTRO-OPTICAL DEVICE, IMAGE PRINTING APPARATUS, AND METHOD OF MANUFACTURING ELECTRO-OPTICAL DEVICE

(75) Inventor: Koichi Uematsu, Shimosuwa-cho (JP)

(73) Assignee: Seiko Epson Corporation, Tokyo (JP)

( * ) Notice: Subject to any disclaimer, the term of this patent is extended or adjusted under 35 U.S.C. 154(b) by 54 days.

(21) Appl. No.: 11/322,269

(22) Filed: Jan. 3, 2006

(65) Prior Publication Data

US 2006/0152652 A1 Jul. 13, 2006

(30) Foreign Application Priority Data

Jan. 12, 2005 (JP) .............................. 2005-004843
Sep. 26, 2005 (JP) .............................. 2005-277267

(51) Int. Cl.
G02B 3/00 (2006.01)
G02B 27/10 (2006.01)
B41J 15/14 (2006.01)
B41J 27/00 (2006.01)

(52) U.S. Cl. .................. 359/654; 347/244; 347/241; 359/626

(58) Field of Classification Search ............... 347/241, 347/244, 256; 359/622, 626, 652, 654
See application file for complete search history.

(56) References Cited

U.S. PATENT DOCUMENTS 5,504,597 A * 4/1996 Sprague et al. ............... 349/57

6,545,819 B1 4/2003 Nanba et al.
6,717,606 B2 * 4/2004 Masuda ..................... 347/244
7,081,912 B2 * 7/2006 Seki et al. .................. 347/244
7,119,826 B2 * 10/2006 Nojima et al. ............. 347/244
2006/0152653 A1 * 7/2006 Uematsu ..................... 349/95

FOREIGN PATENT DOCUMENTS

| JP | A 63-103288 | 5/1988 |
| JP | A 05-038845 | 2/1993 |
| JP | A 2004-058448 | 2/2004 |
| KR | 1998-0081460 A | 11/1998 |
| KR | 2001-0050275 A | 6/2001 |

* cited by examiner

Primary Examiner—David N. Spector
(74) Attorney, Agent, or Firm—Oliff & Berridge, PLC

(57) ABSTRACT

An electro-optical device includes an electro-optical panel which has a plurality of electro-optical elements whose light-emitting characteristics or transmissive characteristics are changed by electrical energy applied; a converging lens array which has a plurality of distributed index lenses, each transmitting light traveling in the electro-optical panel to form an erect image with respect to an image on the electro-optical panel, the images formed by the plurality of distributed index lenses constituting a continuous image; and a transmissive spacer unit which is provided between the electro-optical panel and the converging lens array so as to be bonded to them. The spacer unit includes a laminated structure of a plurality of transmissive spacer members.

10 Claims, 13 Drawing Sheets

ELECTRO-OPTICAL DEVICE, IMAGE PRINTING APPARATUS, AND METHOD OF MANUFACTURING ELECTRO-OPTICAL DEVICE

BACKGROUND

1. Technical Field

The present invention relates to an electro-optical device provided with an electro-optical panel having electro-optical elements, such as light-emitting elements or light valve elements, therein, to an image printing apparatus using an electro-optical device, and to a method of manufacturing an electro-optical device.

2. Related Art

There has been developed a technique for using an electro-luminescent element (hereinafter, referred to as 'EL elements') array to write an electrostatic latent image on an image carrier (for example, a photosensitive drum) of an image printing apparatus using an electrophotography method. In this technique, generally, a converging lens array is provided between the EL element array and the image carrier (for example, see JP-A-63-103288 and JP-A-2004-58448 (FIG. 7)). For example, SLA (SELFOC lens array) available from Nippon Sheet Glass Co., Ltd. is used as an example of the conversing lens array (SELFOC is a registered trade mark of Nippon Sheet Glass Co., Ltd.).

FIG. 1 is a perspective view schematically illustrating a portion of an image printing apparatus using the converging lens array according to the related art. In the image printing apparatus, a converging lens array 40 is provided between a photosensitive drum 110 and a light-emitting panel 12 provided with the EL element array. Light emitted from the EL element array of the light-emitting panel 12 passes through a plurality of distributed index lenses of the converging lens array 40 to reach the photosensitive drum 110.

In general, the image printing apparatus is designed such that the ideal value, that is, the design value of an object distance $L_o$ of the converging lens array to an object is equal to the ideal value, that is, the design value of an object distance $L_1$ to an image. Therefore, when the converging lens array 40 is provided between the light-emitting panel 12 and the photosensitive drum 110, a distance between an incident point of light on the converging lens array 40 and the EL element array is generally equal to a distance between an emission point of light from the converging lens array 40 and the photoreceptor 110, serving as an image carrier.

However, since an air layer having the same thickness as the object distance $L_o$ exists between the incident point of light on the converging lens array 40 and the EL element array, some of light components emitted from the EL elements are not incident on the converging lens array 40. That is, this structure has a problem in that the usage efficiency of light is deteriorated.

SUMMARY

An advantage of some aspects of the invention is that it provides an electro-optical device capable of reducing the loss of light, an image printing apparatus using an electro-optical device, and a method of manufacturing an electro-optical device.

According to an aspect of the invention, an electro-optical device includes an electro-optical panel which has a plurality of electro-optical elements whose light-emitting characteristics or transmissive characteristics are changed by electrical energy applied; a converging lens array which has a plurality of distributed index lenses, each transmitting light traveling in the electro-optical panel to form an erect image with respect to an image on the electro-optical panel, the images formed by the plurality of distributed index lenses constituting a continuous image; and a transmissive spacer unit which is provided between the electro-optical panel and the converging lens array so as to be bonded to them. The spacer unit includes a laminated structure of a plurality of transmissive spacer members.

Here, the term 'electro-optical elements' means elements whose optical characteristics (emission characteristics or transmissive characteristics of light) are changed according to electrical energy applied. The elements whose optical characteristics are changed according to electrical energy include light-emitting elements (for example, electro-luminescent elements and plasma display elements) for converting electrical energy into optical energy and light valve elements (for example, pixels of a liquid crystal display device and pixels of an electrophoresis display device) whose transmittances are changed according to electrical energy. The term 'electro-optical panel' means a panel having an electro-optical device array provided therein. The term 'bonding' includes a state in which the spacer unit is directly bonded to the electro-optical panel and the converging lens array and a state in which the spacer member is bonded to at least one of the electro-optical panel and the converging lens array with a transparent adhesive interposed therebetween.

According to the above-mentioned structure, the spacer unit having a plurality of spacer members is provided between the electro-optical panel and the converging lens array, which makes it possible to improve the ratio of light incident on the converging lens array to light emitted from the light-emitting panel (or light passing through the electro-optical panel) and thus to raise the usage efficiency of light. When a transparent spacer unit (which may include a transparent adhesive) is interposed between the electro-optical panel and the converging lens array, a gap between the light-emitting panel and the converging lens array suitable for focusing an image of the light-emitting panel on the converging lens array increases, compared with the case in which only the air layer is provided therebetween. From another viewpoint, when the gap between the light-emitting panel and the converging lens array is fixed and the gap is larger than the actual object distance of the converging lens array to the light-emitting panel in the air, a spacer unit which is formed by laminating spacer members and has a proper thickness (which includes a transparent adhesive) is provided between the light-emitting panel and the converging lens array to increase the actual object distance. This structure enables the actual object distance to be equal a fixed gap between the light-emitting panel and the converging lens array.

In the above-mentioned structure, it is preferable that the spacer unit have a light absorbing layer formed on a surface thereof not facing the electro-optical panel and the converging lens array. According to this structure, it is possible to prevent light from being incident on the converging lens array due to the internal reflection from the surface of the spacer unit not facing the electro-optical panel and the converging lens array. Therefore, it is possible to prevent an image formed by the reflected light from being mixed with an image formed by the light emitted from the electro-optical panel to the converging lens array through the spacer unit.

Further, in the above-mentioned structure, it is preferable that the spacer unit be provided with a receiving hole into which a transparent adhesive for adhering at least one of the electro-optical panel and the converging lens array to the spacer member is filled. According to this structure, since the adhesive is hardened in the receiving hole, it is possible to improve the appearance of an electro-optical device.

Furthermore, in the above-mentioned structure, it is preferable that at least one of the electro-optical panel and the converging lens array be fitted into the receiving hole. According to this structure, it is possible to accurately arrange at least one of the electro-optical panel and the converging lens array on the spacer unit.

Moreover, in the above-mentioned structure, it is preferable that concave portions into which the adhesive flows from the bottom of the receiving hole be formed in a side surface of the receiving hole of the spacer unit. It is difficult to arrange the adhesive before hardened in only necessary portions of the receiving hole since the adhesive has fluidity. However, the residual adhesive is filled into the concave portions formed in the side surface of the receiving hole. In this way, it is possible to reduce the amount of the adhesive flowing outside the receiving hole to the minimum and thus to improve the appearance of an electro-optical device.

Further, in the above-mentioned structure, it is preferable that grooves into which a transparent adhesive for adhering at least one of the electro-optical panel and the converging lens array to the spacer unit flows be formed in a surface of the spacer unit facing at least one of the electro-optical panel and the converging lens array. It is difficult to arrange the adhesive before hardened in only necessary portions of the spacer unit since the adhesive has fluidity. However, the residual adhesive is filled into the grooves formed in spacer unit. In this way, it is possible to reduce the amount of the adhesive flowing from the gap between the spacer unit and the electro-optical panel or the converging lens array to the outside to the minimum and thus to improve the appearance of an electro-optical device. In the electro-optical device according to this aspect, it is preferable that, when the refractive index of each transmissive element provided between electro-optical elements of the electro-optical panel and the converging lens array is $n_i$, the thickness of each transmissive element is $d_i$, the number of transmissive elements is m, and an object distance of the converging lens array to the electro-optical panel in the air is Lo, the expression 1 be satisfied.

[Expression 1]

$$0.9 \times \sum_{i=1}^{m} \frac{d_i}{n_i} \leq L_o \leq 1.1 \times \sum_{i=1}^{m} \frac{d_i}{n_i} \quad (1)$$

When the expression 1 is satisfied, an image on the electro-optical panel can be substantially focused on the converging lens array. The object distance $L_o$ used in the expression 1 may be the design value of the object distance $L_o$ or may be a value obtained by actual measurement.

Further, according to another aspect of the invention, an image printing apparatus includes image carriers; charging devices that charge the image carriers; the electro-optical device according to claim 1 that radiates light emitted from the electro-optical panel to the converging lens array onto charged surfaces of the image carriers to form latent images thereon; developing devices that attach a toner on the latent images to form toner images on the image carriers; and a transfer device that transfers the toner images from the image carriers to another object. According to the image printing apparatus of this aspect, it is possible to improve the usage efficiency of light.

Furthermore, according to still another aspect of the invention, there is provided a method of manufacturing the electro-optical device according to claim 1. The manufacturing method includes laminating a plurality of spacer members such that the spacer members are bonded to each other; bonding any one of the spacer members to the electro-optical panel; and bonding another member of the spacer members to the converging lens array. Here, the laminating the spacer members such that the spacer members are bonded to each other, the bonding any one of the spacer members to the electro-optical panel, and the bonding another member of the spacer members to the converging lens array may be performed randomly or at the same time. The method of manufacturing the electro-optical device according to the invention makes it possible to improve the usage efficiency of light.

Moreover, according to this aspect, it is preferable that the method of manufacturing the electro-optical device further include measuring an actual object distance $L_o$ of the converging lens array to the electro-optical panel in the air; and calculating the thickness of the spacer unit to be used, on the basis of the object distance $L_o$ and the refractive indexes of the spacer members, so as to satisfy the expression 1.

BRIEF DESCRIPTION OF THE DRAWINGS

The invention will be described with reference to the accompanying drawings, wherein like numbers reference like elements.

DESCRIPTION OF EXEMPLARY EMBODIMENTS

Structure of Electro-optical Device

Figure 2:
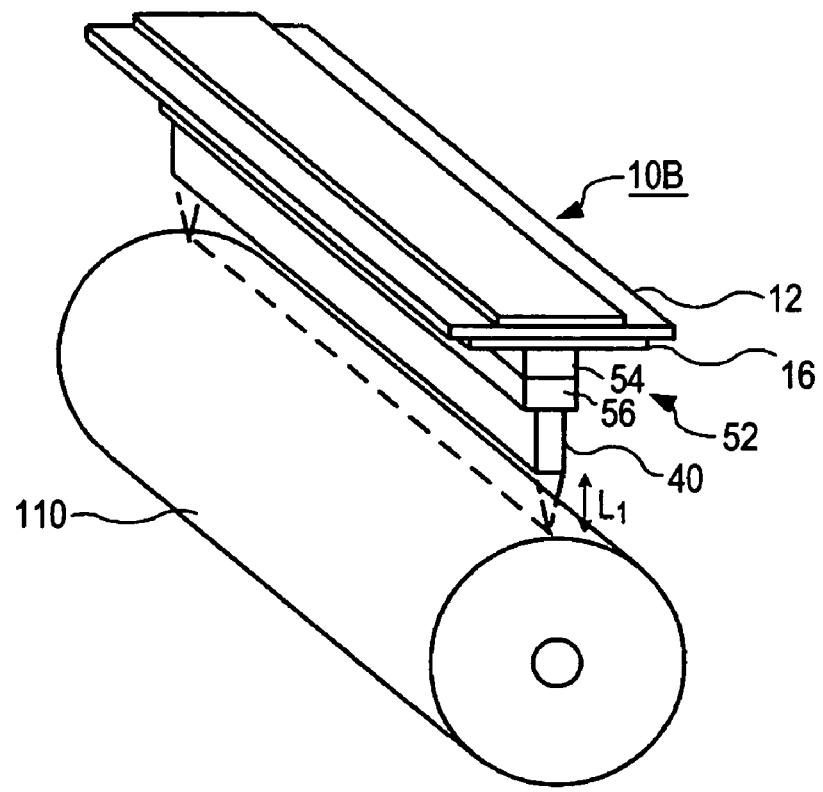
FIG. 2 is a perspective view schematically illustrating an electro-optical device according to an embodiment of the invention.

FIG. 2 is a perspective view schematically illustrating an electro-optical device 10B according to an embodiment of the invention. The electro-optical device 10B shown in FIG. 2 is used as a linear optical head for writing a latent image on an image carrier (for example, a photosensitive drum 110 shown in FIG. 2) in an image printing apparatus using an electrophotography method. The electro-optical device 10B includes a light-emitting panel (an electro-optical panel) 12 having a plurality of organic EL elements (electro-optical elements) arranged on the same surface and a conversing lens array 40 overlapping the light-emitting panel 12. A transmissive spacer unit 52 formed of, for example, glass or plastic is interposed between the light-emitting panel 12 and the converging lens array 40, and the spacer unit 52 has a plurality of laminated transmissive spacer members 56 and 58. The converging lens array 40 is arranged between the light-emitting panel 12 having an EL element array provided therein and the photosensitive drum 110. Light emitted from the organic EL element array of the light-emitting panel 12 reaches the photosensitive drum 110 via the spacer unit 52 and a plurality of distributed index lenses of the converging lens array 40.

Figure 3:
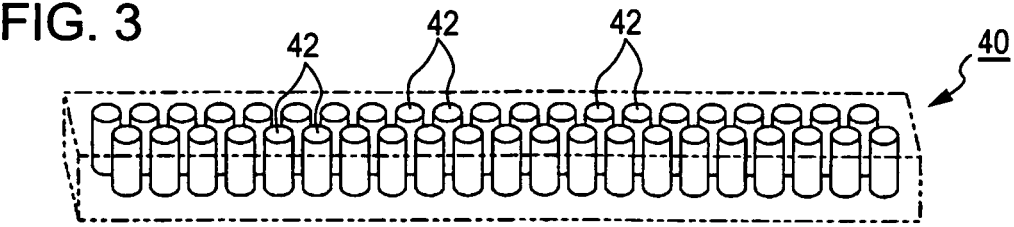
FIG. 3 is a perspective view schematically illustrating a converging lens array used for the electro-optical device according to the embodiment of the invention.

As shown in FIG. 3, the converging lens array 40 includes a plurality of distributed index lenses 42. Each distributed index lens 42 is a graded index fiber which is formed such that a low refractive index is obtained on the central axis, that is, on the optical axis and such that the refractive index increases as it becomes more distant from the central axis. The distributed index lens 42 transmits the light emitted from the light-emitting panel 12 to form an erect image with respect to the image on the light-emitting panel 12 on the photosensitive drum 110. Images obtained by the plurality of distributed index lenses 42 constitute a continuous image on the photosensitive drum 110. For example, SLA (SELFOC lens array) available from Nippon Sheet Glass Co., Ltd. is used as an example of the conversing lens array 40.

Figure 4:
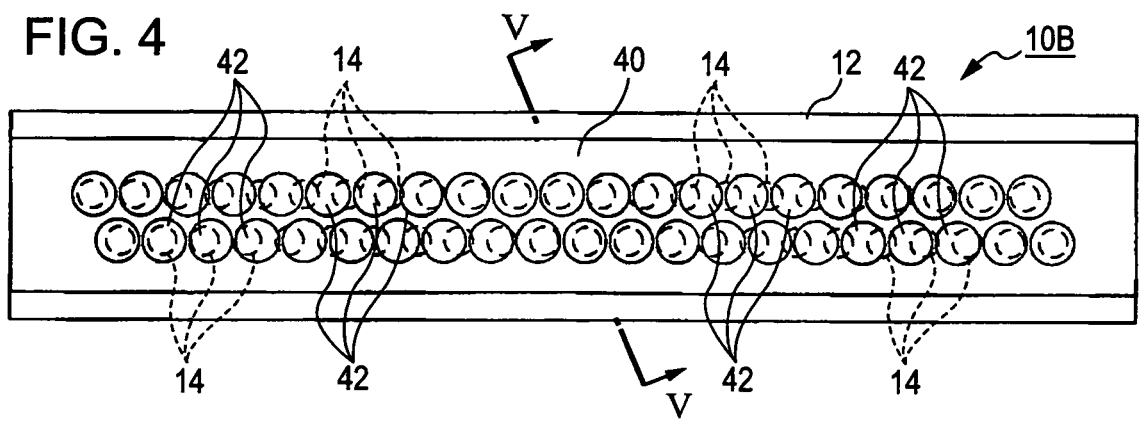
FIG. 4 is a plan view of the electro-optical device shown in FIG. 2.

FIG. 4 is a plan view illustrating the electro-optical device. As shown in FIG. 4, the distributed index lenses 42 are arranged in two rows and in a zigzag pattern, and are fixed to a case of the converging lens array 40 represented by a virtual line. Each distributed index lens 42 overlaps a region in which an EL element 14 of the light-emitting panel 12 is formed. The arrangement pattern of the distributed index lenses 42 is not limited to the shape shown in FIG. 4, but the distributed index lenses 42 may be arranged in other patterns, such as in one row or three or more rows.

Figure 5:
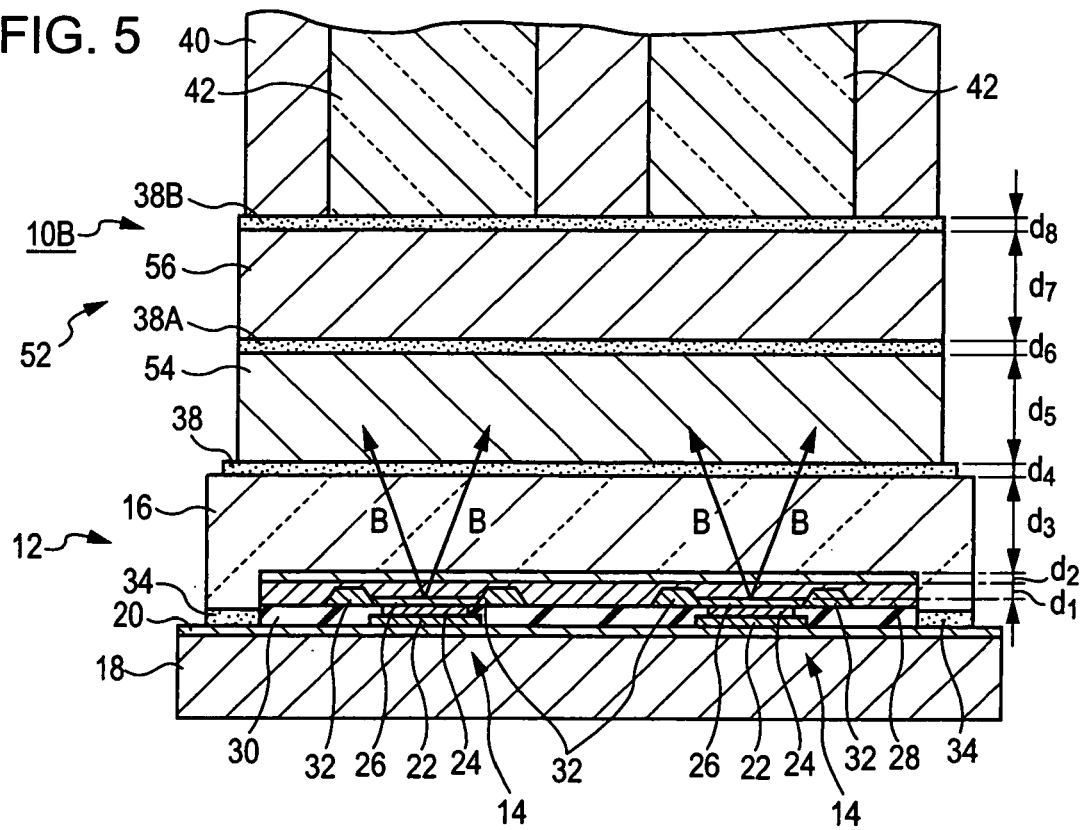
FIG. 5 is a cross-sectional view taken along the line V-V of FIG. 4.

FIG. 5 is a cross-sectional view taken along the line V-V of FIG. 4. As shown in FIG. 5, the light-emitting panel 12 includes a flat substrate 18. The substrate 18 is formed of, for example, glass, plastic, ceramic, or metal. In addition, the substrate 18 may be formed of a transparent or opaque material. A driving element layer 20 is formed on the substrate 18, and a plurality of EL elements 14, serving as light-emitting elements, are formed thereon. Each EL element 14 emits light according to a voltage applied.

Although the inside of the driving element layer 20 is not shown in detail, the driving element layer 20 is provided with a plurality of TFT (thin film transistor) elements and wiring lines for supplying a current to the TFT elements. The TFT elements supply a driving voltage to the individual EL elements 14.

In this embodiment shown in the drawings, light emitted from the EL elements 14 travels in a direction opposite to the substrate 18, that is, in the upper direction of FIG. 5. That is, the light-emitting panel 12 is a top-emission-type OLED light emitting panel. Each EL element 14 includes an anode 22 formed on the driving element layer 20, a hole injecting layer 24 formed on the anode 22, a light-emitting layer 26 formed on the hole injecting layer 24, and a cathode 28 formed on the light-emitting layer 26. The cathode 28 is common to the plurality of EL elements 14.

In order to make the light emitted from the light-emitting layer 26 travel in the upper direction, the anode 22 is formed of, for example, a conductive material having a reflective property, such as aluminum, and the cathode 28 is formed of a transparent material, such as ITO (indium tin oxide). The hole injecting layer 24 and the light-emitting layer 26 are formed in a concave portioned defined by a partition wall 32 and an insulating layer 30. The insulating layer 30 is formed of, for example, $SiO_2$, and the partition wall 32 is formed of, for example, polyimide.

The structure of each EL element 14 is not limited to the above-mentioned structure. For example, the EL element 14 may have a structure in which an electron injecting layer is provided between the cathode and the light-emitting layer or a structure in which an insulating layer is provided at a proper position.

Further, a sealing member 16 is bonded to the substrate 18. The sealing member 16 protects the EL elements 14 from water and air, particularly, in cooperation with the substrate 18, to prevent them from being deteriorated. The sealing member 16 is formed of, for example, glass or transparent plastic. The sealing member 16 is attached to the substrate 18 by using an adhesive 34. For example, a thermosetting adhesive or an ultraviolet-curable adhesive is used as the adhesive 34. As shown in FIG. 5, the adhesive 34 covers a portion of the driving element layer 20 protruding from the sealing member 16.

In this embodiment, gap sealing is used. More specifically, an edge portion of the sealing member 16 is bonded to the substrate 18 by the adhesive 34, and a space partitioned by the sealing member 16 and the substrate 18 is provided around the EL element 14. Preferably, a drying agent is arranged in the space. In order to further protect the EL elements 14 from air, one or more passivation layers may be provided around the sealing member 16.

The spacer member 54 of the spacer unit 52 is bonded to the sealing member 16 of the light-emitting panel 12 by an adhesive 38. For example, a thermosetting adhesive or an ultraviolet-curable adhesive is used as the adhesive 38. The sealing member 16 and the spacer member 54 of the spacer unit 52 may be directly bonded to each other without the adhesive 38 interposed therebetween or may be bonded to each other with the adhesive 38 interposed therebetween. When the adhesive 38 is interposed between the sealing member 16 and the spacer member 54, a transparent adhesive 38 is used.

The spacer member 56 is bonded to the spacer member 54 by an adhesive 38A. The spacer members 54 and 56 may be directly bonded to each other without the adhesive 38A interposed therebetween or may be bonded to each other with the adhesive 38A interposed therebetween. When the adhesive 38A is interposed between the spacer members 54 and 56, the adhesive 38A may be the same as the adhesive 38. The spacer member 54 has a flat surface facing the sealing member 16 and the other flat surface facing the spacer member 56. The spacer member 56 has a flat surface facing the spacer member 54 and the other flat surface facing the converging lens array 40.

The converging lens array 40 is bonded to the spacer member 56 of the spacer unit 52 by an adhesive 38B. The spacer member 56 of the spacer unit 52 and the distributed index lenses 42 of the converging lens array 40 may be directly bonded to each other without the adhesive 38B interposed therebetween or may be bonded to each other with the adhesive 38B interposed therebetween. When the adhesive 38B is interposed between the spacer member 56 and the distributed index lenses 42, the adhesive 38B may be the same as the adhesive 38. In this embodiment shown in FIG. 5, the spacer unit 52 has the two spacer members 54 and 56, but may include three or more spacer members.

As the adhesives 38, 38A, and 38B, the following adhesives can be used: Optodyne UV-3200 (a registered trade mark) available from Daikin Industries, Co., LTD., which is an ultraviolet-curable epoxy adhesive having a refractive index of 1.514 close to the refractive index of glass after hardened; Optokleb HV153 (a registered trade mark) available from Ardel, Co., LTD., which is an ultraviolet-curable epoxy adhesive having a refractive index of 1.63 higher than the refractive index of glass after hardened; and Optodyne UV-4000 (a registered trade mark) available from Daikin Industries, Co., LTD., which is an ultraviolet-curable epoxy adhesive having a refractive index of 1.567 after hardened. However, the invention is not limited to these adhesives.

In this way, light emitted from the EL elements 14 of the light-emitting panel 12 is incident on the distributed index lens 42 through the spacer unit 52 overlapping the EL elements 14, as represented by arrow B in FIG. 5. Then, as shown in FIG. 6, the light passes through the converging lens array 40 to reach the photosensitive drum 110.

Figure 6:
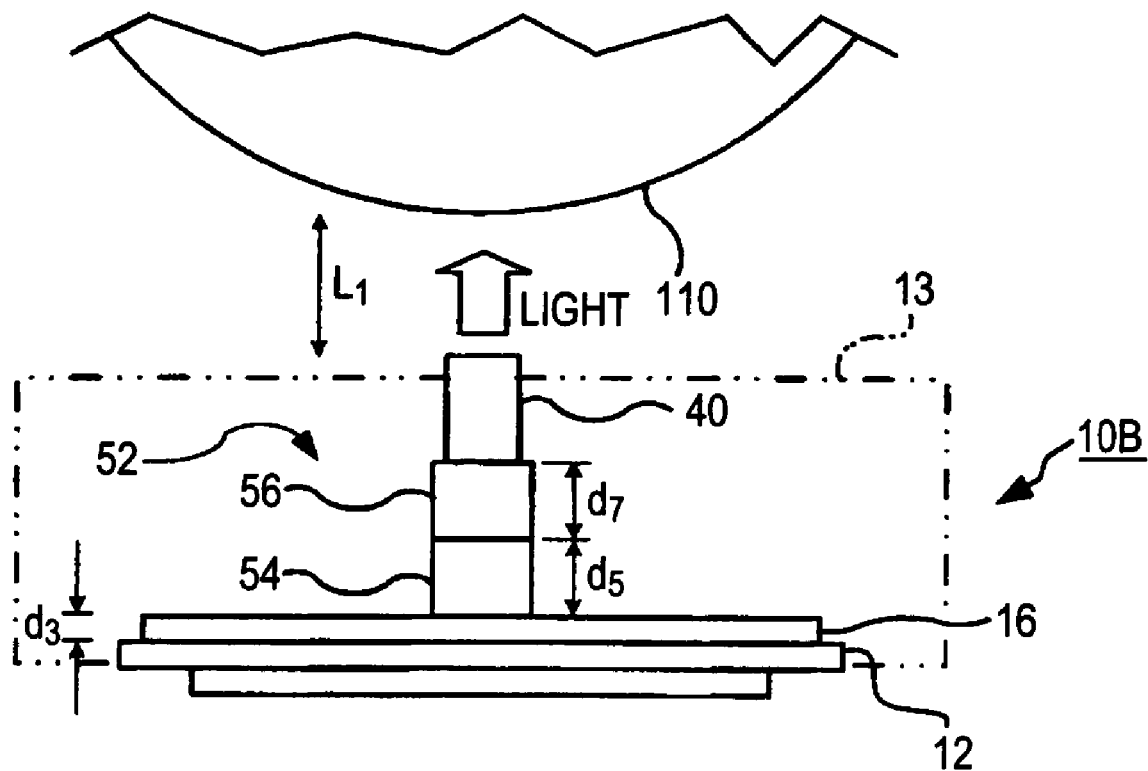
FIG. 6 is a front view of the electro-optical device shown in FIG. 2.

As represented by a virtual line in FIG. 6, the light-emitting panel 12 is attached to a cover 13, and the cover 13 covers all side surfaces of the light-emitting panel 12 and the converging lens array 40. The cover 13 prevents external light from being incident on the converging lens array 40 through, for example, the light-emitting panel 12 and the sealing member 16, thereby preventing the distortion of an image. Although the cover 13 is not shown in the other drawings, practically, the cover 13 is provided.

Figure 1:
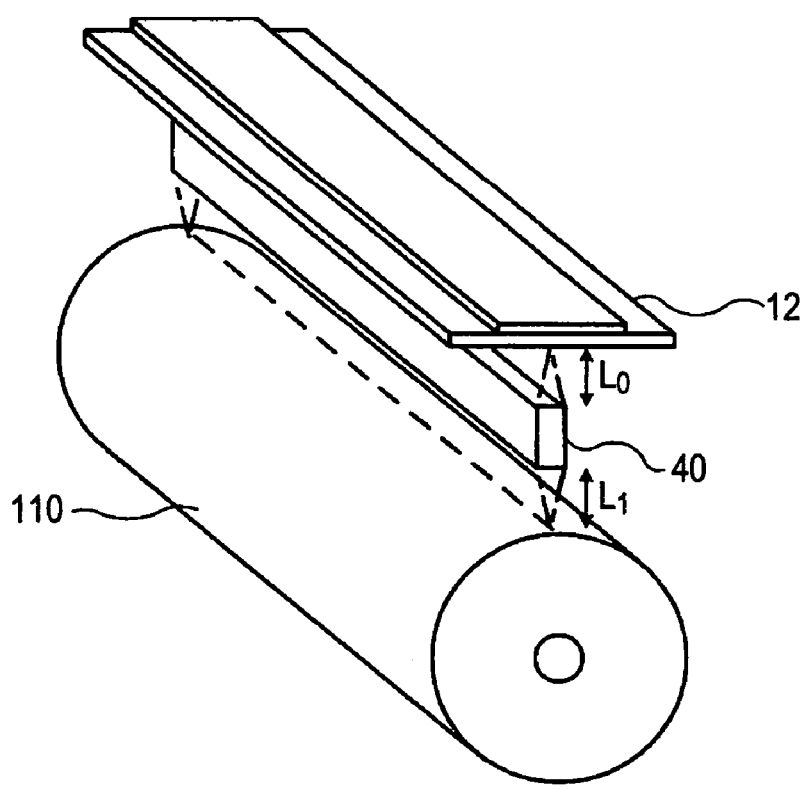
FIG. 1 is a perspective view schematically illustrating a portion of an image printing apparatus according to the related art.

It is preferable that the electro-optical device 10B and the image printing apparatus according to this embodiment be designed so as to satisfy the following expression 1. In the expression 1, '$L_o$' indicates an actual object distance of the converging lens array 40 to an object (to the light-emitting panel 12) in the air (see FIG. 1). In addition, '$n_i$' indicates a refractive index of each transmissive element arranged between the EL elements 14 (particularly, the light-emitting layer 26) of the light-emitting panel 12 and the converging lens array, and '$d_i$' indicates the thickness of each transmissive element arranged between the EL elements 14 (particularly, the light-emitting layer 26) of the light-emitting panel 12 and the converging lens array. A subscript '$i$' is an identifier for discriminating these transmissive elements, and a character '$m$' is the number of transmissive elements.

The image printing apparatus is designed such that the ideal value, that is, the design value of the object distance of the converging lens array 40 to an object is equal to the ideal value, that is, the design value thereof to an image. The design value may be used as the object distance $L_o$ in the expression 1. However, the design values may be different from each other due to a misalignment in manufacture.

Therefore, it is preferable to actually measure the object distance $L_o$ of the converging lens array 40 to an object (to the light-emitting panel 12) and to substitute it into the expression 1. When the expression 1 is satisfied, an image on the electro-optical panel is substantially focused on the converging lens array 40. Further, when the distance between the converging lens array 40 and the photosensitive drum 110 is equal to the actual object distance of the converging lens array 40 to the object (to the photosensitive drum 110) in the air, an image corresponding to the image on the electro-optical panel is formed on an image formation surface (in this embodiment, the photosensitive drum 110) in a substantially focused state.

More preferably, the image printing apparatus is designed so as to satisfy the following expression 2. When the expression 2 is satisfied, an image on the electro-optical panel is completely focused on the converging lens array 40. The expression 1 is obtained by giving an allowable range of ±10% to the right side of the expression 2. How to obtain the expression 2 will be described later.

[Expression 2]

$$L_o = \sum_{i=1}^{m} \frac{d_i}{n_i} \quad (2)$$

Next, preferred design values of this embodiment will be described in detail with reference to FIGS. 2, 5, and 6. When the expressions 1 and 2, which are general expressions, are applied to this embodiment, the following expressions 3 and 4 are obtained:

$$0.9 \times (d_1/n_1 + d_2/n_2 + d_3/n_3 + d_4/n_4 + d_5/n_5 + d_6/n_6 + d_7/n_7 + d_8/n_8) \leq L_o \leq 1.1 \times (d_1/n_1 + d_2/n_2 + d_3/n_3 + d_4/n_4 + d_5/n_5 + d_6/n_6 + d_7/n_7 + d_8/n_8) \quad (3), \text{ and}$$

$$L_o = d_1/n_1 + d_2/n_2 + d_3/n_3 + d_4/n_4 + d_5/n_5 + d_6/n_6 + d_7/n_7 + d_8/n_8 \quad (4).$$

In these expressions 3 and 4, $d_1$ is the thickness of the cathode 28 overlapping the light-emitting layer 26, and $n_1$ is the refractive index of the cathode 28. $d_2$ is the thickness of an air layer arranged on the upper side of the light-emitting layer 26, and $n_2$ is the refractive index of the air layer (about 1). $d_3$ is the thickness of a portion of the sealing member 16 arranged on the upper side of the light-emitting layer 26, and $n_3$ is the refractive index of the sealing member 16. $d_4$ is the thickness of the transparent adhesive 38 between the sealing member 16 and the spacer member 54. When the adhesive 38 is not provided between the sealing member 16 and the spacer member 56, the thickness of the adhesive 38 is zero. In addition, $n_4$ is the refractive index of the transparent adhesive 38. $d_5$ is the thickness of the spacer member 54, and $n_5$ is the refractive index of the spacer member 54. $d_6$ is the thickness of the transparent adhesive 38A between the spacer members 54 and 56. When the adhesive 38A is not provided between the spacer members 54 and 56, the thickness of the adhesive 38A is zero. In addition, $n_6$ is the refractive index of the transparent adhesive 38A. $d_7$ is the thickness of the spacer member 56, and $n_7$ is the refractive index of the spacer member 56. $d_8$ is the thickness of the transparent adhesive 38B between the spacer member 56 and the distributed index lens 42 of the converging lens array 40. When the adhesive 38B is not provided between the spacer member 56 and the distributed index lens 42, the thickness of the adhesive 38B is zero. In addition, $n_8$ is the refractive index of the transparent adhesive 38B.

Since the values of $d_1$, $d_2$, $d_4$, $d_6$, and $d_8$ are very small, the image printing apparatus may be actually designed so as to satisfy the following expression 5:

$$0.9 \times (d_3/n_3 + d_5/n_5 + d_7/n_7) \leq L_o \leq 1.1 \times (d_3/n_3 + d_5/n_5 + d_7/n_7) \quad (5).$$

According to this embodiment, the light-emitting panel 12 and the converging lens array 40 are bonded to each other with the spacer unit 52 interposed therebetween, which makes it possible to improve the ratio of light incident on the converging lens array 40 to light emitted from the light-emitting panel 12 and thus to raise the usage efficiency of light. Therefore, it is possible to obtain the same degree of luminance by applying, to the EL element 14, a lower voltage than that used in the related art and thus to lengthen the life span of the EL element 14. The basis of an improvement in the usage efficiency of light will be described later.

When the image printing apparatus is designed to satisfy the expression 1, 3, or 5, it is possible to prevent defocusing between an image on the light-emitting panel 12 and the converging lens array 40.

Figure 7:
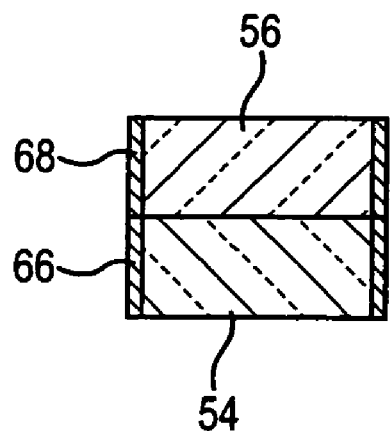
FIG. 7 is a cross-sectional view illustrating spacer members used for the electro-optical device shown in FIG. 6.

FIG. 7 is a cross-sectional view of the spacer members 54 and 56. As shown in FIG. 7, light absorbing layers 66 and 68 are formed on all side surfaces (surfaces not facing the light-emitting panel 12 and the converging lens array 40) of the spacer members 54 and 56. When the internal reflection of light occurs on the side surfaces of the spacer members 54 and 56, an image formed by the reflected light is mixed with an image formed by the light emitted from the EL element 14 to the converging lens array 40 through the spacer members 54 and 56, which results in a low-definition image.

In contrast, the light absorbing layers 66 and 68 formed on the side surfaces of the spacer members 54 and 56 reduce the internal refection from the side surfaces, which makes it possible to prevent light from being incident on the converging lens array 40 due to the internal reflection. Therefore, it is possible to prevent the image formed by the reflected light from being mixed with the image formed by the light emitted from the EL element 14 to the converging lens array 40 through the spacer members 54 and 56.

The light absorbing layers 66 and 68 can be provided by coating a black pigment on the side surfaces of the spacer members 54 and 56. However, in this case, there is a fear that light will be reflected from an interface between the spacer member 54 and the light absorbing layer 66 and from an interface between the spacer member 56 and the light absorbing layer 68 since the black pigment does not completely shield light. Therefore, it is preferable that the refractive indexes of the light absorbing layers 66 and 68 be higher than those of the spacer members 54 and 56.

When light travels from a medium having a high refractive index to a medium having a low refractive index, total reflection may occur according to the incident angle of light. Therefore, when the refractive indexes of the light absorbing layers 66 and 68 are lower than those of the spacer members 54 and 56, the image formed by the reflected light is mixed with the image formed by the light emitted from the EL element 14 to the converging lens array 40 through the spacer members 54 and 56, which results in a low-definition image. In contrast, when the refractive indexes of the light absorbing layers 66 and 68 are higher than those of the spacer members 54 and 56, little internal reflection occurs from the interfaces, so that almost all light components traveling toward the side surfaces of the spacer members 54 and 56 are absorbed into the light absorbing layers 66 and 68, or they pass through the light absorbing layers 66 and 68.

Thus, the selection of a proper pigment makes it possible to obtain the light absorbing layers 66 and 68 having preferred refractive indexes.

BASIS OF EFFECTS OF THIS EMBODIMENT

Figure 8:
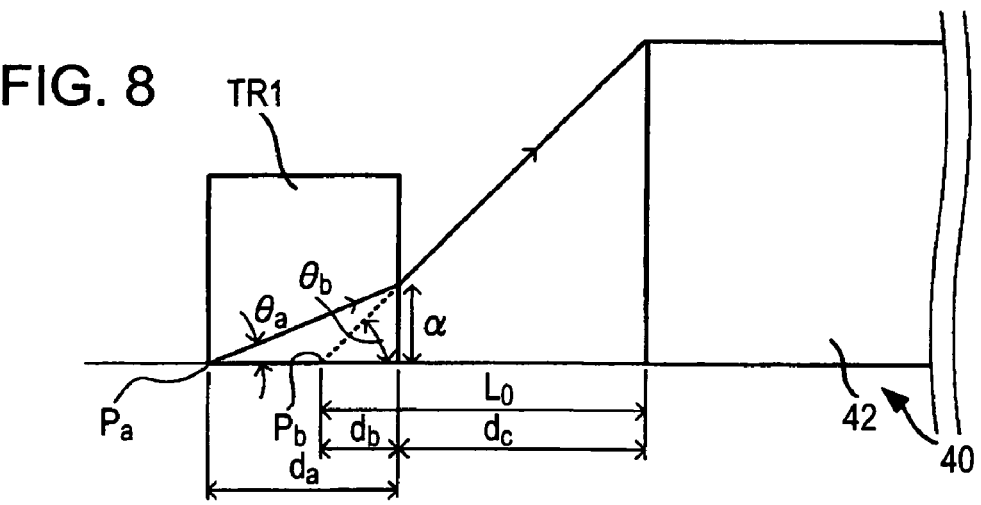
FIG. 8 is a diagram schematically illustrating an example of the path of light when a solid transmissive element and an air layer are provided between the actual emission position and a distributed index lens of the converging lens array such that the transmissive element is adjacent to the emission position.

FIG. 8 shows an example of the path of light when a solid transmissive element TR1 and an air layer are arranged between the actual emission position and the distributed index lens 42 of the converging lens array 40 (see FIGS. 3 to 5). Next, the ground of the expression 2 will be described in detail.

In FIG. 8, $P_a$ is a point located at the emission position where focusing on the distributed index lens 42 of the converging lens array 40 is actually obtained. It is assumed that light is emitted from the position $P_a$ coming into contact with the transmissive element TR1. In addition, α indicates a distance between a position where light traveling from the point $P_a$ on the emission position is emitted from the transmissive element TR1 and a line vertically drawn from the point $P_a$ on the emission position to the section of the transmissive element TR1. $L_o$ indicates the actual object distance of the converging lens array 40 to an object (to the light-emitting panel 12) in the air. $P_b$ indicates a point separated from the converging lens array 40 by the actual object distance thereof to the object in the air. Assuming that an air layer, not the transmissive element TR1, is provided between the emission position and the converging lens array 40, a light beam emitted from the point $P_b$ is focused on the converging lens array 40. That is, when an air layer, not the transmissive element TR1, is provided between the emission position and the converging lens array 40, $P_b$ is a point on a virtual emission position with respect to the converging lens array 40.

In FIG. 8, the following expression 6 is established by Snell's law:

$$n_b \cdot \sin\theta_b \approx \sin\theta_b = n_a \cdot \sin\theta_a \qquad (6),$$

where $n_b$ is a refractive index of air, $\theta_b$ is an incident angle of light from an interface between the air and the transmissive element TR1 to the air, $n_a$ is a refractive index of the transmissive element TR1, and $\theta_a$ is an emission angle of light from an interface between the transmissive element TR1 and the air to the transmissive element TR1. In this case, since $n_a > n_b \approx 1$, the relationship $\theta_b > \theta_a$ is obtained.

Further, in FIG. 8, the following expressions 7 and 8 are established:

$$\tan\theta_a = \alpha/d_a \qquad (7), \text{ and}$$

$$\tan\theta_b = \alpha/d_b \qquad (8),$$

where $d_a$ is the thickness of the transmissive element TR1, and $d_b$ is a distance from the point $P_b$ on the virtual emission position to the interface between the transmissive element TR1 and the air.

The following expression 9 is obtained from the expressions 6 to 8:

$$d_b = d_a \cdot \cos\theta_b / n_a \cdot \cos\theta_a \qquad (9).$$

In a paraxial optical system using the converging lens array 40, since $\theta_a$ and $\theta_b$ have very small values of less than 15°, $\cos\theta_b/\cos\theta_a$ is approximately 1. Therefore, the expression 9 can be rearranged to the following expression 10:

$$d_b = d_a/n_a \qquad (9).$$

When the thickness of the air layer between the transmissive element TR1 and the converging lens array 40 is $d_c$, the relationship $L_o = d_b + d_c$ is established. Therefore, when the actual object distance $L_o$ of the converging lens array 40 to an object (to the light-emitting panel 12) in the air, the thickness $d_a$ of the transmissive element TR1, and the refractive index $n_a$ satisfy the following expression 11, an image formed by light passing through the actual emission position is focused on the converging lens array 40:

$$L_o = d_b + d_c = d_a/n_a + d_c \qquad (11).$$

Further, as can be seen from the above-mentioned description, the transmissive element TR1 having a higher refractive index than that of the air is interposed between the emission position and the converging lens array 40, which results in an increase in the focus distance of the converging lens array 40 to an object. That is, the point $P_a$ on the actual emission position is preferably positioned further away from the converging lens array 40 than the point $P_b$ on the virtual emission position in order to focus an image formed by light passing through the emission position on the converging lens array 40.

Figure 9:
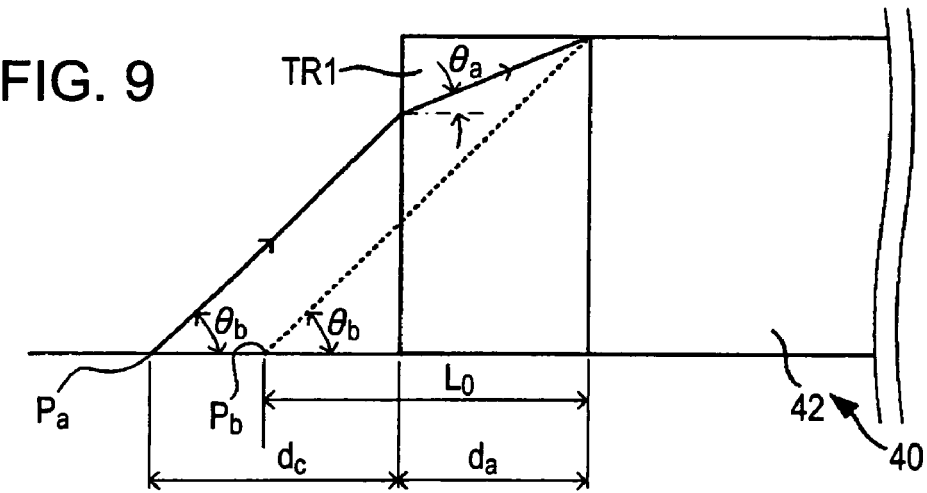
FIG. 9 is a diagram schematically illustrating an example of the path of light when the solid transmissive element and the air layer are provided between the actual emission position and the distributed index lens of the converging lens array such that the transmissive element is adjacent to the distributed index lens.
Figure 10:
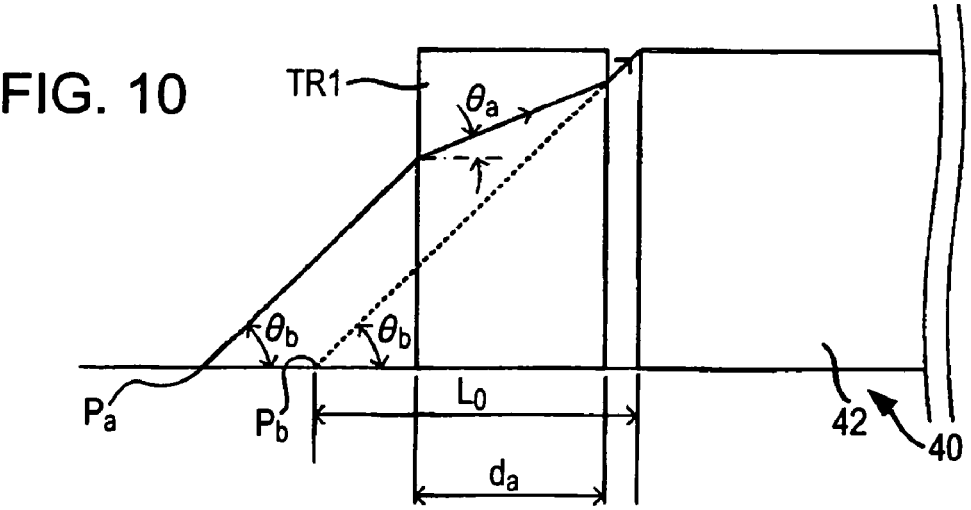
FIG. 10 is a diagram schematically illustrating an example of the path of light when the solid transmissive element and the air layer are provided between the actual emission position and the distributed index lens of the converging lens array such that the transmissive element is separated from the emission position and the distributed index lens.

FIG. 9 shows an example of the path of light when the transmissive element TR1 is adjacent to the entrance of light of the distributed index lens 42 of the converging lens array 40 under the same conditions as those in FIG. 8. In addition, FIG. 10 shows an example of the path of light when the transmissive element TR1 is provided between the distributed index lens 42 of the converging lens array 40 and the point $P_a$ on the actual emission position so as to be separated from them under the same conditions as those in FIG. 8. The examples shown in FIGS. 9 and 10 differ from the example shown in FIG. 8 in the position of the transmissive element TR1. Therefore, in this case, when the expression 11 is satisfied, an image formed by light passing through the actual emission position is focused on the converging lens array 40.

Figure 11A:
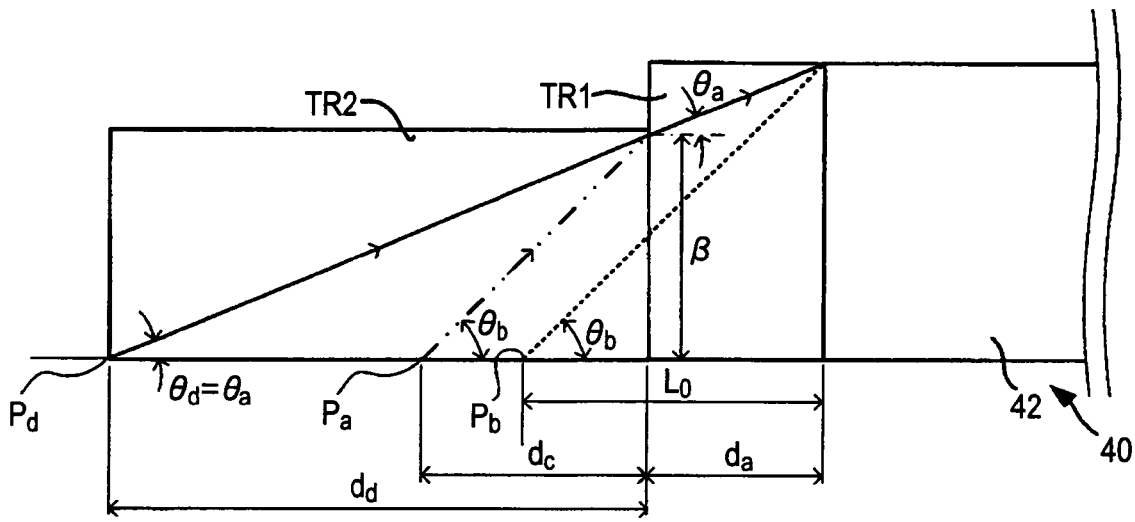
FIG. 11A is a diagram schematically illustrating an example of the path of light when two transmissive elements having the same refractive index are provided between the actual emission position and the distributed index lens of the converging lens array.
Figure 11B:
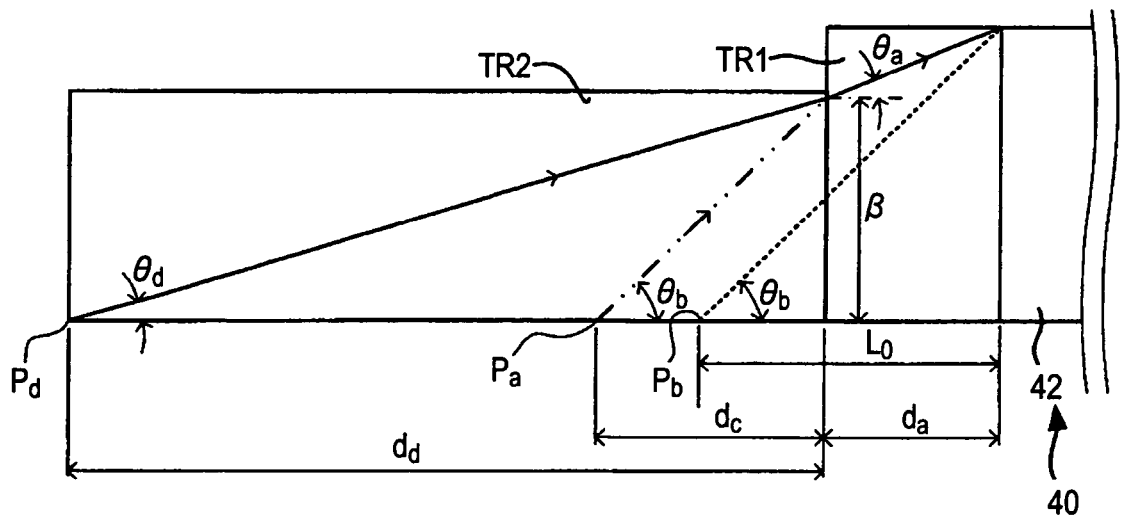
FIG. 11B is a diagram schematically illustrating an example of the path of light when two transmissive elements having different refractive indexes are provided between the actual emission position and the distributed index lens of the converging lens array.

FIG. 11A shows an example of the path of light when the solid transmissive element TR1 and a solid transmissive element TR2 having the same refractive index as that of the solid transmissive element TR1 are provided between the actual emission position and the distributed index lens 42 of the converging lens array 40. FIG. 11B shows an example of the path of light when the solid transmissive element TR1 and a solid transmissive element TR2 having a different refractive index from that of the solid transmissive element TR1 are provided between the actual emission position and the distributed index lens 42 of the converging lens array 40. In FIGS. 11A and 11B, similar to FIG. 9, the transmissive element TR1 is adjacent to the entrance of light of the distributed index lens 42 of the converging lens array 40, and the transmissive element TR2 is interposed between the actual emission position $P_d$ and the transmissive element TR1.

In FIGS. 11A and 11B, $P_b$ is a point on the virtual emission position where the distributed index lens 42 of the converging lens array 40 is focused when an air layer, not the transmissive elements TR1 and TR2, is provided between the emission position and the converging lens array 40 (which is the same as the point $P_b$ shown in FIGS. 8 to 10). $P_a$ is a point on the virtual emission position where the distributed index lens 42 of the converging lens array 40 is focused when only the transmissive element TR1 is provided between the emission position and the converging lens array 40 (which is the same as the point $P_a$ shown in FIGS. 8 to 10). In addition, $P_d$ indicates a point on the emission position where the distributed index lens 42 of the converging lens array 40 is actually focused. Here, it is assumed that light is emitted from a position $P_d$ coming into contact with the transmissive element TR2. In addition, β indicates a distance between a position where light traveling from the point $P_d$ on the emission position is emitted from the transmissive element TR2 and a line vertically drawn from the point $P_d$ on the emission position to the sections of the transmissive elements TR1 and TR2.

In FIGS. 11A and 11B, the following expression 12 is established by Snell's law:

$$n_b \cdot \sin \theta_b \approx \sin \theta_b = n_a \cdot \sin \theta_a = n_d \cdot \sin \theta_d \quad (12).$$

In the expression 12, $n_b$ is a refractive index of air; $\theta_b$ is an emission angle of light from an interface between the air and the transmissive element TR1 to the air when the transmissive element TR2 is not provided; $n_a$ is a refractive index of the transmissive element TR1; and $\theta_a$ is an incident angle of light from an interface between the transmissive element TR1 and the air to the transmissive element TR1 when the transmissive element TR2 is not provided and is an incident angle of light from an interface between the transmissive elements TR1 and TR2 to the transmissive element TR1 when the transmissive element TR2 is provided. In this case, since $n_a > n_b \approx 1$, the relationship $\theta_b > \theta_a$ is obtained. In addition, $n_d$ is a refractive index of the transmissive element TR2; $\theta_d$ is an emission angle of light from the interface between the transmissive elements TR1 and TR2 to the transmissive element TR2 when the transmissive element TR2 is provided. In this case, since $n_d > n_b \approx 1$, the relationship $\theta_b > \theta_d$ is obtained. In FIG. 11A, since the refractive index $n_a$ of the transmissive element TR1 is equal to the refractive index $n_d$ of the transmissive element TR2, the relationship $\theta_d = \theta_a$ is established.

Further, in FIGS. 11A and 11B, the following expressions 13 and 14 are established:

$$\tan \theta_d = \beta/d_d \quad (13), \text{ and}$$

$$\tan \theta_b = \beta/d_c \quad (14),$$

where $d_d$ is the thickness of the transmissive element TR2, and $d_c$ is a distance from the point $P_a$ on the virtual emission position to the interface between the transmissive elements TR1 and TR2.

The following expression 15 is obtained from the expressions 12 to 14:

$$d_c = d_d \cdot \cos \theta_b / n_d \cdot \cos \theta_d \quad (15).$$

In a paraxial optical system using the converging lens array 40, since $\theta_d$ and $\theta_b$ generally have very small values of less than 15°, $\cos \theta_b / \cos \theta_d$ is approximately 1. Therefore, the expression 15 can be rearranged to the following expression 16:

$$d_c = d_d / n_d \quad (16).$$

When $d_c$ of the expression 16 is substituted into the expression 8 obtained from FIG. 8, the following expression 17 is obtained:

$$L_o = d_b + d_c = d_d / n_a + d_c = d_a / n_a + d_d / n_d \quad (17).$$

In FIG. 11A, since the refractive index $n_a$ of the transmissive element TR1 is equal to the refractive index $n_d$ of the transmissive element TR2, the following expression 18 is obtained:

$$L_o = d_a / n_a + d_d / n_d = (d_a + d_d)/n_a \quad (18).$$

Therefore, when the actual object distance $L_o$ of the converging lens array 40 to an object (to the light-emitting panel 12) in the air, the thickness $d_a$ of the transmissive element TR1, the refractive index $n_a$ of the transmissive element TR1, the thickness $d_d$ of the transmissive element TR2, and the refractive index $n_d$ of the transmissive element TR2 satisfy the expression 17, an image formed by light passing through the actual emission position is focused on the converging lens array 40. As can be seen from the above-mentioned description, the transmissive elements TR1 and TR2 having a higher refractive index than that of the air are interposed between the emission position and the converging lens array 40, which results in an increase in the focus distance of the converging lens array 40 to an object. That is, the point $P_d$ on the actual emission position is preferably positioned further away from the converging lens array 40 than the point $P_b$ on the virtual emission position in order to focus an image formed by light passing through the emission position on the converging lens array 40.

For example, When $L_o = 2.4$ mm, $d_d = 0.5$ mm, and the refractive indexes $n_a$ and $n_d$ of the transmissive elements TR1 and TR2 are 1.52, the following is obtained: $2.4 = 0.5/1.52 + d_a/1.52$. Therefore, $d_a$ is 3.148 mm. Thus, the distance between the actual emission position $P_d$ and the converging lens array 40 is $d_a + d_d = 3.648$ mm.

A general expression 2 is obtained from the above-mentioned description. In FIGS. 8 to 11B, the solid transmissive elements TR1 and TR2 are used as an example. However, it is apparent to those skilled in the art that, when an air layer is provided between the EL elements 14 (particularly, the light-emitting layer 26) of the light-emitting panel 12 and the converging lens array, the air layer is considered as a transmissive element, so that the refractive index of the air layer, which is approximately 1, and the thickness thereof can be substituted into the general expression 2. In general, an optical distance is obtained by summing up the products of refractive indexes and thicknesses. However, in the expression 2, the optical distance is calculated by summing up the ratios of thicknesses to refractive indexes in order to obtain focusing on the converging lens array 40.

As described above, when a transparent spacer unit (may include a transparent adhesive) is provided between the light-emitting panel 12 and the converging lens array 40, a gap between the light-emitting panel 12 and the converging lens array 40 suitable for focusing an image of the light-emitting panel 12 on the converging lens array 40 increases, compared with the case in which only the air layer is provided therebetween. From another viewpoint, when the gap between the light-emitting panel 12 and the converging lens array 40 is fixed (for example, when the light-emitting panel 12 and the converging lens array 40 are fixed to the cover 13 shown in FIG. 6) and the gap is larger than the actual object distance of the converging lens array 40 to the light-emitting panel 12 in the air, a spacer unit which is formed by laminating spacer members and has a proper thickness (which includes a transparent adhesive) is provided between the light-emitting panel 12 and the converging lens array 40 to increase the actual object distance. This structure enables the actual object distance to be equal the fixed gap between the light-emitting panel 12 and the converging lens array 40.

Further, in this embodiment, the basis of effects of improving the ratio of light incident on the converging lens array 40 to light emitted from the light-emitting panel 12 and thus of raising the usage efficiency of light will be described. In the paraxial optical system, the larger a different in refractive index between two media becomes, the higher the refractive index on an interface between the two media is. Therefore, as shown in FIGS. 8 and 10, when the air layer is provided between the emission position and the converging lens array 40, a considerably large amount of light is reflected from an interface between the solid transmissive element (for example, glass) and the air and an interface between the air and the distributed index lens 42, which results in a reduction in the ratio of light incident on the converging lens array 40 to light emitted from the emission position. On the other hand, as shown in FIGS. 11A and 11B, when a plurality of transmissive elements is provided between the emission position and the converging lens array 40 and the refractive indexes of these transmissive elements are substantially equal to each other, a small amount of light is reflected from interfaces between the transmissive elements (for example, glass and the adhesive 38), and a small amount of light is reflected from the interface between the transmissive element and the distributed index lens 42 (although the refractive index of the distributed index lens 42 depends on positions, it is generally approximate to that of glass). Therefore, in this case, the ratio of light incident on the converging lens array 40 to light emitted from the emission position is high.

In the above-mentioned embodiment, the spacer member is provided between the light-emitting panel 12 and the converging lens array 40. When the light-emitting panel 12 is adhered to the converging lens array 40 or when the spacer member is adhered to the light-emitting panel 12 or the converging lens array 40, an adhesive having a refractive index close to that of glass is used. Therefore, it is possible to more improve the usage efficiency of light, compared to the related art shown in FIG. 1.

Figure 12A:
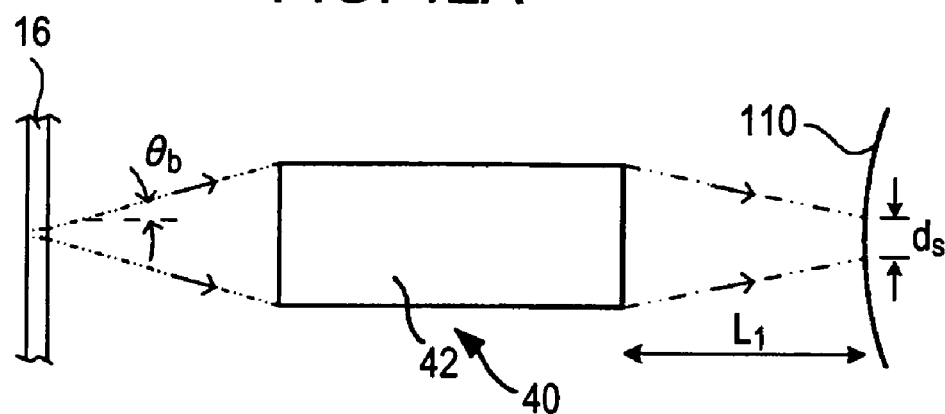
FIG. 12A is a diagram illustrating outmost light components which are emitted from one spot to the distributed index lens to be focused on a photosensitive drum when only an air layer is provided between the converging lens array and a sealing member of the light-emitting panel.
Figure 12B:
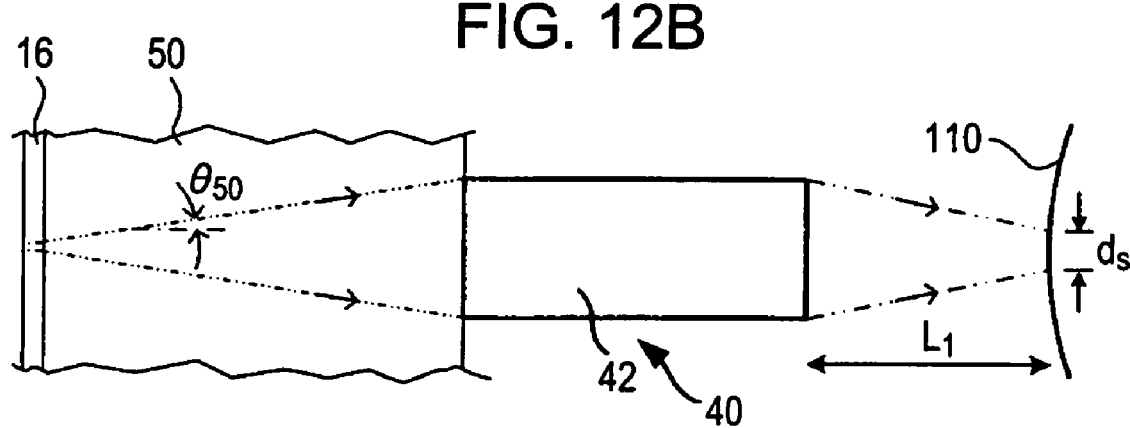
FIG. 12B is a diagram illustrating outmost light components which are emitted from one spot to the distributed index lens to be focused on a photosensitive drum when a spacer member is provided between the converging lens array and a sealing member of the light-emitting panel.

FIG. 12A shows outmost light components which are emitted from one spot to the photosensitive drum 110 via the distributed index lens 42 when only an air layer is provided between the sealing member 16 of the light-emitting panel 12 and the converging lens array 40. FIG. 12B shows outmost light components which are emitted from one spot to the photosensitive drum 110 via the distributed index lens 42 when the spacer member 50 is provided between the sealing member 16 of the light-emitting panel 12 and the converging lens array 40. In FIG. 12A, the traveling angle of the outmost light component in the air layer is $\theta_b$. When the sealing member 16 is formed of glass, that is, has a refractive index $n_a$ of 1.52, and the traveling angle of light in the sealing member 16 is 8°, $\theta_b=12.3°$ is obtained by Snell's law. On the other hand, in FIG. 12B, the traveling angle of the outmost light component in the spacer member 50 is $\theta_{50}$. When the sealing member 16 and the spacer member 50 are formed of glass, that is, have a refractive index $n_a$ of 1.52, and the traveling angle of light in the sealing member 16 is 8°, $\theta_{50}=8°$ is obtained by Snell's law.

As shown in FIG. 12A, when only the air layer is provided between the sealing member 16 of the light-emitting panel 12 and the converging lens array 40, a distance between the sealing member 16 and the distributed index lens 42 becomes small, and thus the allowance of the distance becomes small. For example, when the distance is larger than a predetermined value, the traveling angle $\theta_b$ of light in the air layer becomes large. As a result, a large amount of light travels outside the distributed index lens 42 without traveling toward the distributed index lens 42, resulting in low usage efficiency of light. On the other hand, when the distance is smaller than a predetermined value, a diameter $d_s$ of a spot focused on the photosensitive drum 110 becomes large. As a result, the resolution of a latent image formed on the photosensitive drum 110 is lowered.

In contrast, as shown in FIG. 12B, when the spacer member 50 is provided between the sealing member 16 of the light-emitting panel 12 and the converging lens array 40, a distance between the sealing member 16 and the distributed index lens 42 increases, which results in an increase in the allowance of the distance. Therefore, it is possible to reduce defects, compared with the example shown in FIG. 12A.

Manufacturing Method of Electro-optical Device

Figure 13:
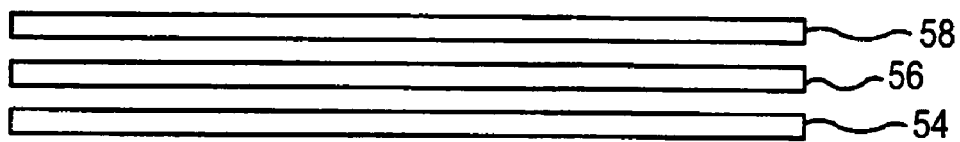
FIG. 13 is a side view illustrating spacer members constituting a spacer unit which is interposed between the light-emitting panel and the converging lens array.

Next, a manufacturing method of the above-mentioned electro-optical device will be described. First, the converging lens array 40 and the light-emitting panel 12 are prepared, and the object distance $L_o$ of the converging lens array 40 to the light-emitting panel 12 in the air is measured. Then, the thickness of a spacer unit to be used is calculated so as to satisfy the expression 1, preferably, the expression 2, on the basis of the object distance $L_o$ and the refractive index and the thickness of the spacer member to be used (on the basis of the refractive index and thickness of an adhesive at the time of hardening when the refractive index and thickness of the adhesive are considered). Subsequently, a combination of spacer members constituting the spacer unit is determined on the basis of the calculated thickness of the spacer unit. More specifically, a plurality of spacer members having different thicknesses is prepared in advance, and the spacer members are selected so that the thickness of a combination of spacer members is substantially equal to the calculated thickness of the spacer unit. For example, as shown in FIG. 13, spacer members 54, 56, and 58 are selected as members constituting the spacer unit 52.

Figure 14:
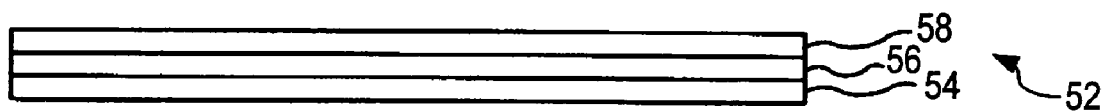
FIG. 14 is a side view illustrating the spacer unit formed by bonding the spacer members.
Figure 15:
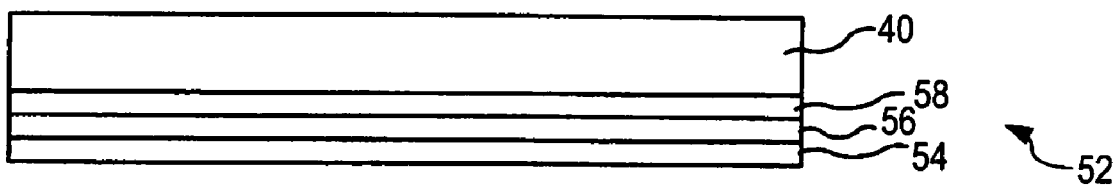
FIG. 15 is a side view illustrating the spacer unit to which the converging lens array is bonded.
Figure 16:
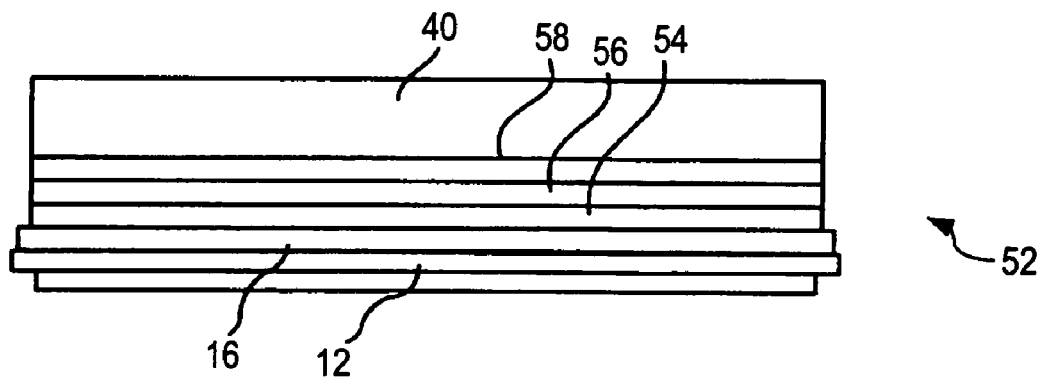
FIG. 16 is a side view illustrating an electro-optical device obtained by bonding the converging lens array and the light-emitting panel to the spacer unit.
Figure 17:
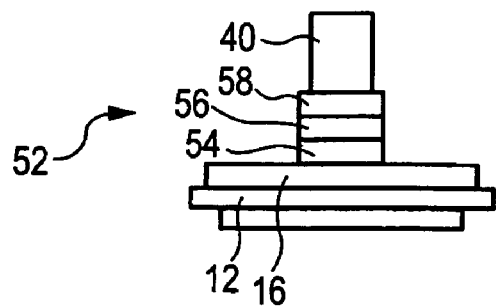
FIG. 17 is a front view illustrating the electro-optical device shown in FIG. 16.

Next, as shown in FIG. 14, the plurality of spacer members 54, 56, and 58 are laminated and bonded to each other by an adhesive, thereby obtaining the spacer unit 52. Then, as shown in FIG. 15, the converging lens array 40 is bonded to the spacer member 58, which is an outmost layer of the spacer unit 52, by, for example, an adhesive, and the light-emitting panel 12 is bonded to the spacer member 54, which is the other outmost layer of the spacer unit 52, by, for example, an adhesive. In this way, as shown in FIGS. 16 and 17, an electro-optical device having the light-emitting panel 12 and the converging lens array 40 bonded to each other with the spacer unit 52 interposed therebetween is obtained. However, a process for bonding the spacer members 54, 56, and 58, a process for bonding the spacer member 54 to the light-emitting panel 12, and a process for bonding the spacer member 58 to the converging lens array 40 may be performed randomly or at the same time. When the expression 1, preferably, the expression 2 is satisfied, the spacer unit 52 having a thickness suitable for the actual object distance of the converging lens array 40 is obtained, so that an image on the light-emitting panel 12 is substantially focused on the converging lens array 40.

Figure 18:
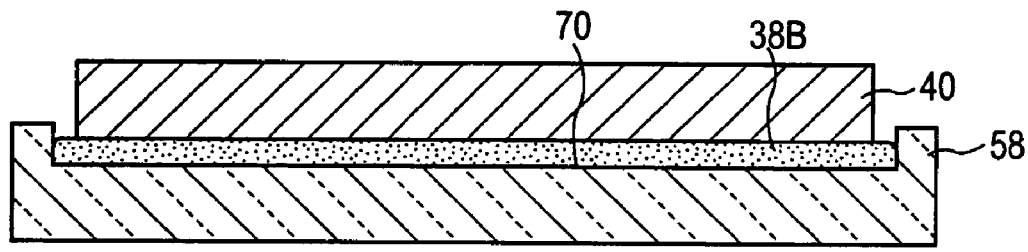
FIG. 18 is a side sectional view illustrating a state in which the converging lens array is adhered to the spacer unit having a receiving hole for receiving an adhesive.
Figure 19:
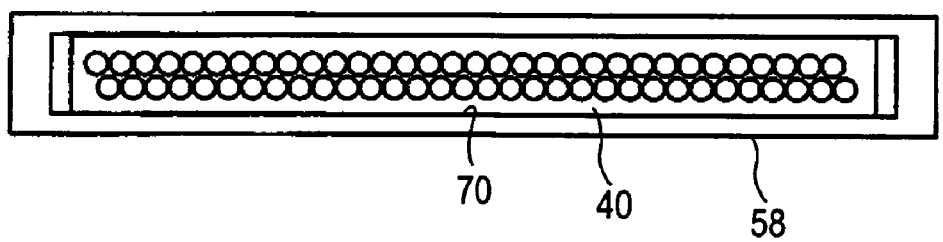
FIG. 19 is a plan view of FIG. 18.
Figure 20:
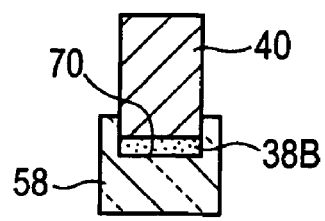
FIG. 20 is a front sectional view of FIG. 18.

As shown in FIGS. 18 to 20, it is preferable that the adhesive 38B be arranged on the spacer member 58 of the spacer unit 52 adjacent to the converging lens array 40 and a receiving hole 70 to which the converging lens array 40 is fitted be formed in the spacer member 58. In this way, since the adhesive 38B is hardened in the receiving hole 70, the adhesive 38B can be cleanly formed therein. In addition, the receiving hole 70 enables the converging lens array 40 to be accurately arranged on the spacer unit 52. In particular, as shown in FIGS. 19 and 20, the receiving hole 70 has an inner side surface parallel to a lengthwise side surface of the converging lens array 40, and it is preferable that the length of the inner surfaces be substantially equal to the width of the converging lens array 40. Since the adhesive 38B is filled into the receiving hole 70 so as to closely adhere to the inner surface thereof, the hardened adhesive 38B has a flat side surface parallel to the lengthwise side surface of the converging lens array 40. Alternatively, widthwise side surfaces of the converging lens array 40 may be separated from the side surface of the receiving hole 70. Therefore, the adhesive 38B may protrude from the widthwise side surfaces of the converging lens array 40 and the light-emitting panel 12, or it may be recessed a little from the widthwise side surfaces thereof. In order to obtain focusing on the converging lens array 40 as expected, the adhesive 38B should be completely arrange in an optical path from the EL element 14 of the light-emitting panel 12 to the distributed index lens 42 of the converging lens array 40. In order to achieve this object, the adhesive 38B can be easily applied by making the adhesive before hardened flow in the lengthwise direction of the converging lens array 40 and the light-emitting panel 12 while bringing the adhesive 38B into contact with the lengthwise side surface of the receiving hole 70. As a result, the hardened adhesive 38B has a flat side surface parallel to the lengthwise side surfaces of the converging lens array 40 and the light-emitting panel 12, but is not flush with the widthwise side surfaces thereof.

Figure 21:
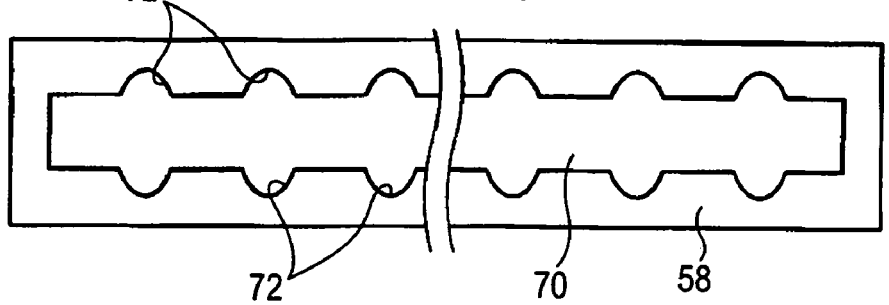
FIG. 21 is a plan view illustrating a modification of the receiving hole for receiving an adhesive.
Figure 22:
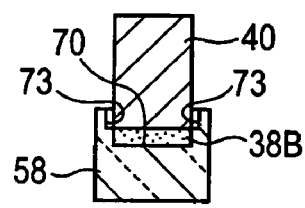
FIG. 22 is a front sectional view illustrating the modification of the receiving hole for receiving an adhesive.

As shown in FIGS. 21 and 22, it is preferable that the side surface of the receiving hole 70 of the spacer member be provided with concave portions 72 or 73 into which the transparent adhesive 38B for adhering the converging lens array 40 to the spacer member 58 is filled from the bottom surface of the receiving hole 70. It is difficult to arrange the adhesive 38B before hardened in only necessary portions of the receiving hole 70 since the adhesive 38B has fluidity. However, the residual adhesive 38B is filled into the concave portions 72 or 73 formed in the side surface of the receiving hole 70. In this way, the adhesive 38B can more reliably contact the side surface of the receiving hole 70, and it is possible to reduce the amount of the adhesive 38 flowing outside the receiving hole 70 to the minimum and thus to improve the appearance of an electro-optical device.

Figure 23:
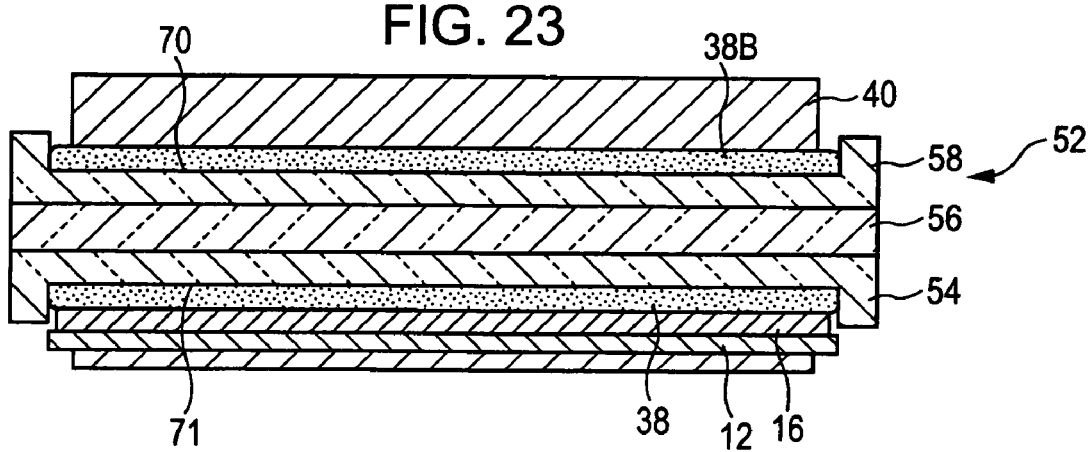
FIG. 23 is a side sectional view illustrating a state in which the converging lens array is adhered to another spacer unit having a receiving hole for receiving an adhesive.
Figure 24:
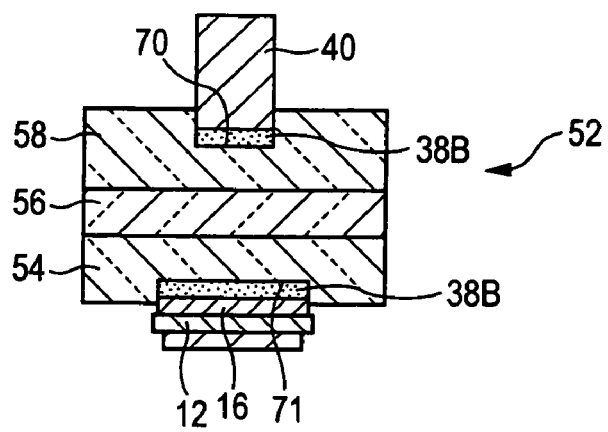
FIG. 24 is a front sectional view of FIG. 23.

Further, as shown in FIGS. 23 and 24, it is preferable that, in addition to the receiving hole 70 of the spacer member 58 (or instead of the receiving hole 70), the adhesive 38 be arranged on the spacer member 54 of the spacer unit 52 adjacent to the light-emitting panel 12 and that a receiving hole 71 for fitting the light-emitting panel 12 be formed in the spacer member 54. Since the adhesive 38 is hardened in the receiving hole 71, the adhesive 38 can be cleanly formed therein. In addition, the receiving hole 71 enables the light-emitting panel 12 to be accurately arranged on the spacer unit 52. As shown in FIG. 24, the receiving hole 70 has an inner side surface parallel to a lengthwise side surface of the sealing member 16 of the light-emitting panel 12, and it is preferable that the length of the inner surface be substantially equal to the width of the sealing member 16. In this way, the adhesive 38 can be easily applied by making the adhesive 38 before hardened flow in the lengthwise direction of the converging lens array 40 and the light-emitting panel 12 while bringing the adhesive 38B into contact with the lengthwise side surface of the receiving hole 71. As a result, the adhesive 38 can be completely arrange in an optical path from the EL element 14 of the light-emitting panel 12 to the distributed index lens 42 of the converging lens array 40. The concave portions 72 or 73 may be provided in the receiving hole 71.

Figure 25:
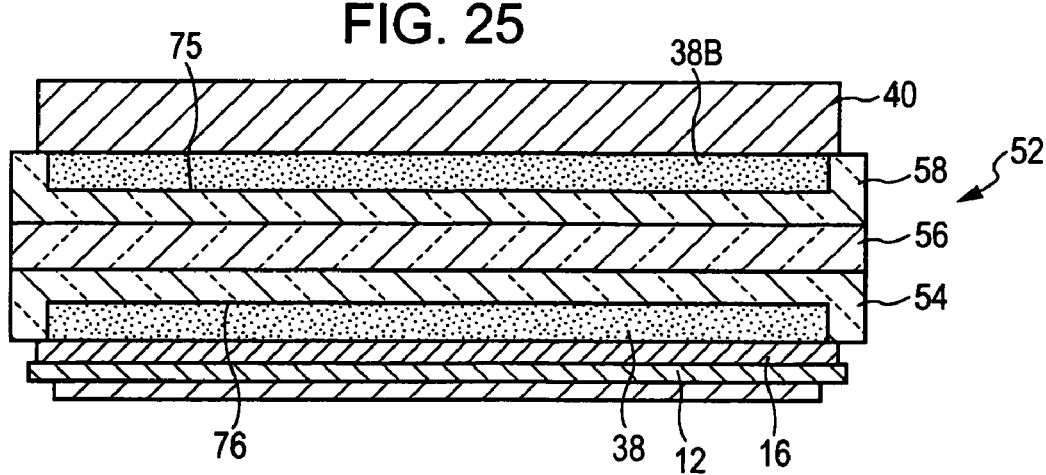
FIG. 25 is a side sectional view illustrating a state in which the converging lens array is adhered to still another spacer unit having a receiving hole for receiving an adhesive.
Figure 26:
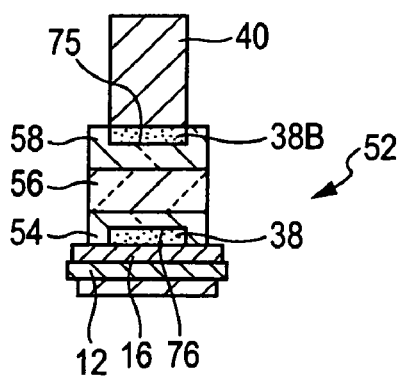
FIG. 26 is a front sectional view of FIG. 25.

Further, as shown in FIGS. 25 and 26, the spacer unit 52 may be provided with receiving holes 75 and 76 in which the transparent adhesives 38 and 38B for adhering the light-emitting panel 12 and the converging lens array 40 to the spacer unit 52 are respectively arranged. In this way, since the adhesives 38 and 38B are hardened in the receiving holes 75 and 76, respectively, the adhesives 38 and 38B can be cleanly formed therein. The concave portions 72 or 73 may be provided in the receiving holes 75 and 76. The receiving hole 75 or the receiving hole 76 may not be provided, and the receiving holes 71 and 75 may be formed in the spacer unit. In addition, the receiving holes 70 and 76 may be formed in the spacer unit.

Figure 27:
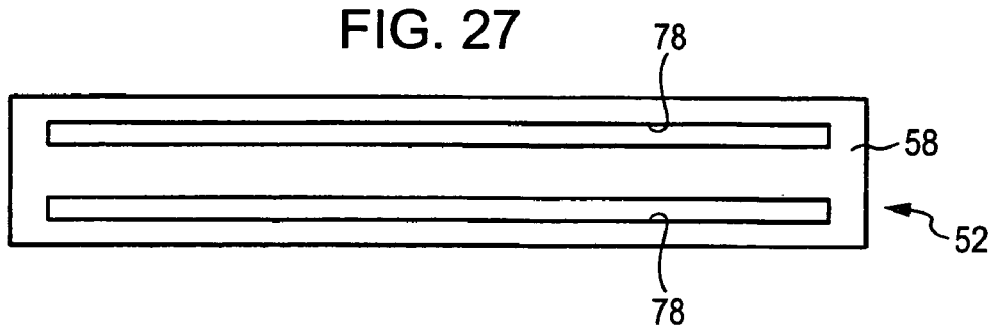
FIG. 27 is a plan view illustrating a spacer member having grooves for containing an adhesive in both surfaces thereof.
Figure 28:
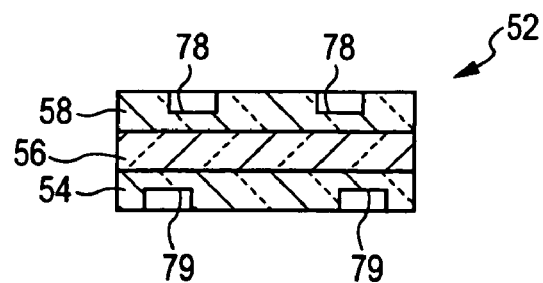
FIG. 28 is a cross-sectional view of FIG. 27.
Figure 29:
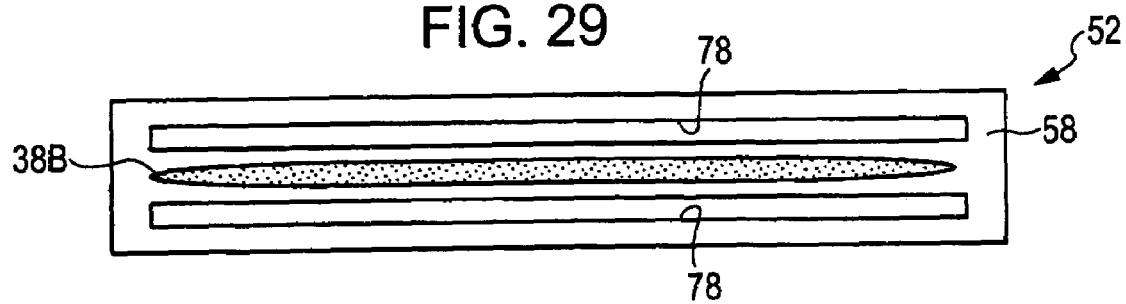
FIG. 29 is a plan view illustrating the adhesive arranged on the spacer member shown in FIG. 27.
Figure 30:
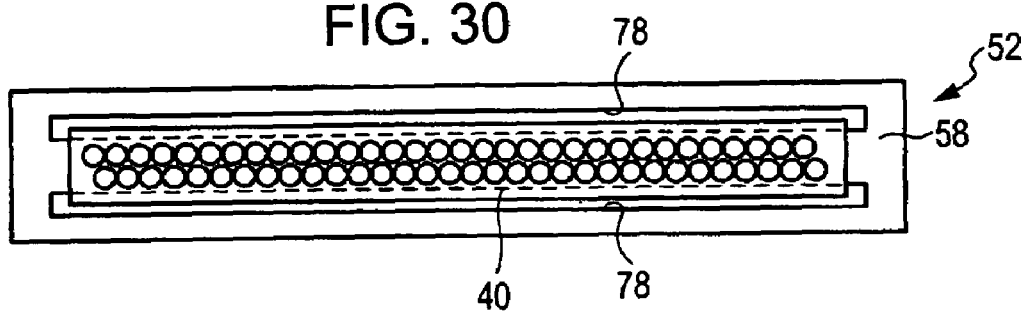
FIG. 30 is a plan view illustrating the converging lens array arranged on the spacer member shown in FIG. 27.
Figure 31:
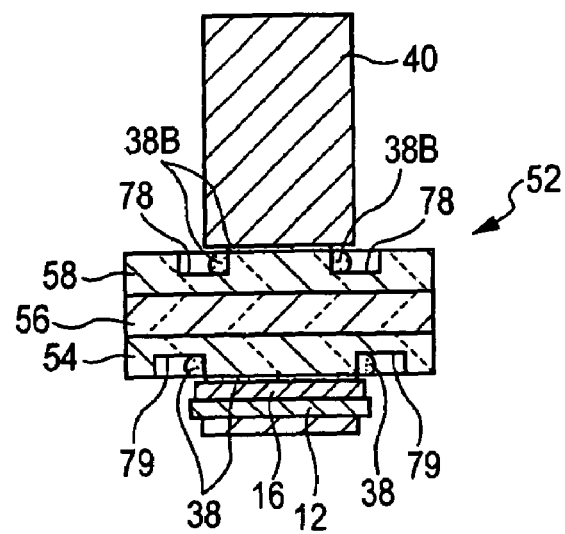
FIG. 31 is a front sectional view illustrating an electro-optical device having the spacer member shown in FIG. 27.

Furthermore, as shown in FIG. 27 or 28, grooves 78 and 79 into which the adhesives 38 and 38B flow may be formed in both surfaces of the spacer unit 52, respectively. A pair of grooves 78 extending in the lengthwise direction of the space unit 52 are formed in the surface of the spacer member 58 of the spacer unit 52, and a pair of grooves 79 extending in the lengthwise direction of the space unit 52 are formed in the surface of the spacer member 54 of the spacer unit 52. As shown in FIGS. 29 and 31, the adhesive 38 is arranged between the pair of grooves 78. As shown in FIG. 31, the adhesive 38B is arranged between the pair of grooves 79 on the other side. As shown in FIGS. 30 and 31, the converging lens array 40 is arranged at the center of the surface of the space member 58, with the edge thereof overlapping the grooves 78, and is then adhered thereto. As shown in FIG. 31, the sealing member 16 is arranged at the center of the surface of the space member 54, with the edge thereof overlapping the grooves 79, and is then adhered thereto.

It is difficult to arrange the adhesives 38 and 38B before hardened in only necessary portions of the spacer unit 52 since the adhesives 38 and 38B have fluidity. However, as shown in FIG. 31, the residual adhesives 38 and 38B are filled into the grooves 78 and 79 formed in the spacer unit 52. In this way, it is possible to reduce the amount of the adhesives 38 and 38B flowing from a gap between the spacer unit 52 and the light-emitting panel 12 or the converging lens array 40 to the outside to the minimum and thus to improve the appearance of an electro-optical device. The grooves may be provided in only one surface of the spacer unit 52.

Image Printing Apparatus

As described above, the electro-optical device (for example, the electro-optical device 10B) according to this embodiment can be used as a linear optical head for writing a latent image on an image carrier of an image printing apparatus using an electrophotography method. The image printing apparatus includes, for example, a printer, a printing part of a copy machine, and a printing part of a facsimile.

Figure 32:
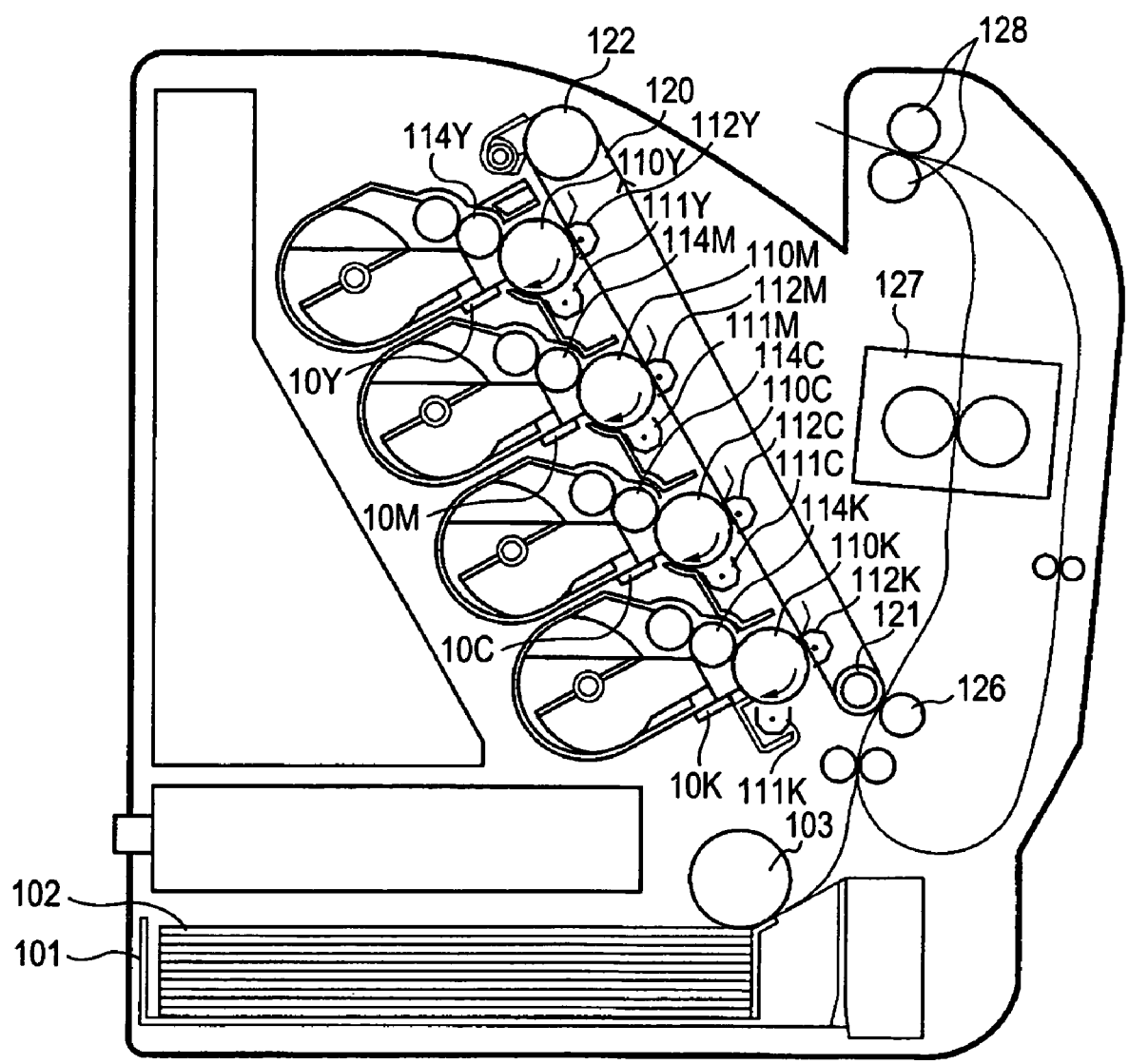
FIG. 32 is a longitudinal sectional view illustrating an example of an image printing apparatus using the electro-optical device according to any one of the first to fifth embodiments of the invention.

FIG. 32 is a longitudinal cross-sectional view illustrating an example of an image printing apparatus using any one of the electro-optical devices according to this embodiment as a linear optical head. This image printing apparatus is a tandem full color image printing apparatus using a belt intermediate transfer method.

In this image printing apparatus, four organic EL array exposure heads 10K, 10C, 10M, and 10Y having the same structure are arranged at exposure positions of four photosensitive drums (image carriers) 110K, 110C, 110M, and 110Y having the same structure. The organic EL array exposure heads 10K, 10C, 10M, and 10Y correspond to any one of the electro-optical devices according to this embodiment.

As shown in FIG. 32, the image printing apparatus has a driving roller 121, a driven roller 122, an endless intermediate transfer belt 120 wound around the driving roller 121 and the driven roller 122, and the intermediate transfer belt 122 circulates around the rollers 121 and 122 in the direction of arrow shown in FIG. 32. Although not shown, a tension applying unit for applying tension to the intermediate transfer belt 120, such as a tension roller, may be provided.

The four photosensitive drums 110K, 110C, 110M, and 110Y are disposed at predetermined intervals around the intermediate transfer belt 120. Each photosensitive drum has a photosensitive layer on the outer peripheral surface thereof. Suffixes 'K', 'C', 'M', and 'Y' added to reference numerals indicate black, cyan, magenta, and yellow, respectively. This is similarly applied to other members. The photosensitive drums 110K, 110C, 110M, and 110Y are rotated in synchronism with the driving of the intermediate transfer belt 120.

A corona charger 111 (K, C, M, and Y), an organic EL array exposure head 10 (K, C, M, and Y), and a developing device 114 (K, C, M, and Y) are arranged around each photosensitive drum 110 (K, C, M, and Y). The corona charger 111 (K, C, M, and Y) uniformly charges the outer peripheral surface of the corresponding photosensitive drum 110 (K, C, M, and Y). The organic EL array exposure head 10 (K, C, M, and Y) writes an electrostatic latent image on the charged outer peripheral surface of the photosensitive drum. Each organic EL array exposure head 10 (K, C, M, and Y) is arranged in such a manner that a plurality of OLED elements 14 is arranged along a bus (in the main scanning direction) of the photosensitive drum 110 (K, C, M, and Y). The writing of the electrostatic latent image is performed by radiating light emitted from the plurality of OLED elements 14 on the photosensitive drum. The developing device 114 (K, C, M, and Y) applies toner as a developer onto the electrostatic latent image to form a toner image, that is, a visible image on the photosensitive drum.

Black, cyan, magenta, and yellow toner images formed by single-color toner image forming stations for the four colors are sequentially primarily transferred onto the intermediate transfer belt 120 so as to be superimposed on the intermediate transfer belt 120, thereby forming a full-color toner image. Four primary transfer corotrons (transfer devices) 112 (K, C, M, and Y) are arranged inside the intermediate transfer belt 120. The primary transfer corotrons 112 (K, C, M, and Y) are arranged in the vicinities of the photosensitive drums 110 (K, C, M, and Y), respectively, and electrostatically attract the toner images from the photosensitive drums 110 (K, C, M, and Y) to transfer the toner images onto the intermediate transfer belt 120 passing between the photosensitive drums and the primary transfer corotrons.

Finally, sheets 102, which are image forming targets, are fed one by one from a paper feed cassette 101 to a nip between a secondary transfer roller 126 and the intermediate transfer belt 120 coming into contact with the driving roller 121 by a pick-up roller 103. The full-color toner image on the intermediate transfer belt 120 are collectively secondary-transferred onto one surface of the sheet 120 by the secondary transfer roller 126 and is then fixed on the sheet 120 by a pair of fixing rollers 127 serving as a fixing unit. Then, the sheet 102 is discharged onto a paper discharge cassette formed on the upper side of the apparatus by a pair of paper discharge rollers 128.

The image printing apparatus shown in FIG. 32 uses any one of the electro-optical devices using an organic EL array as a writing unit, which makes it possible to improve the usage efficiency of light.

Next, another embodiment of the image printing apparatus according to the invention will be described.

Figure 33:
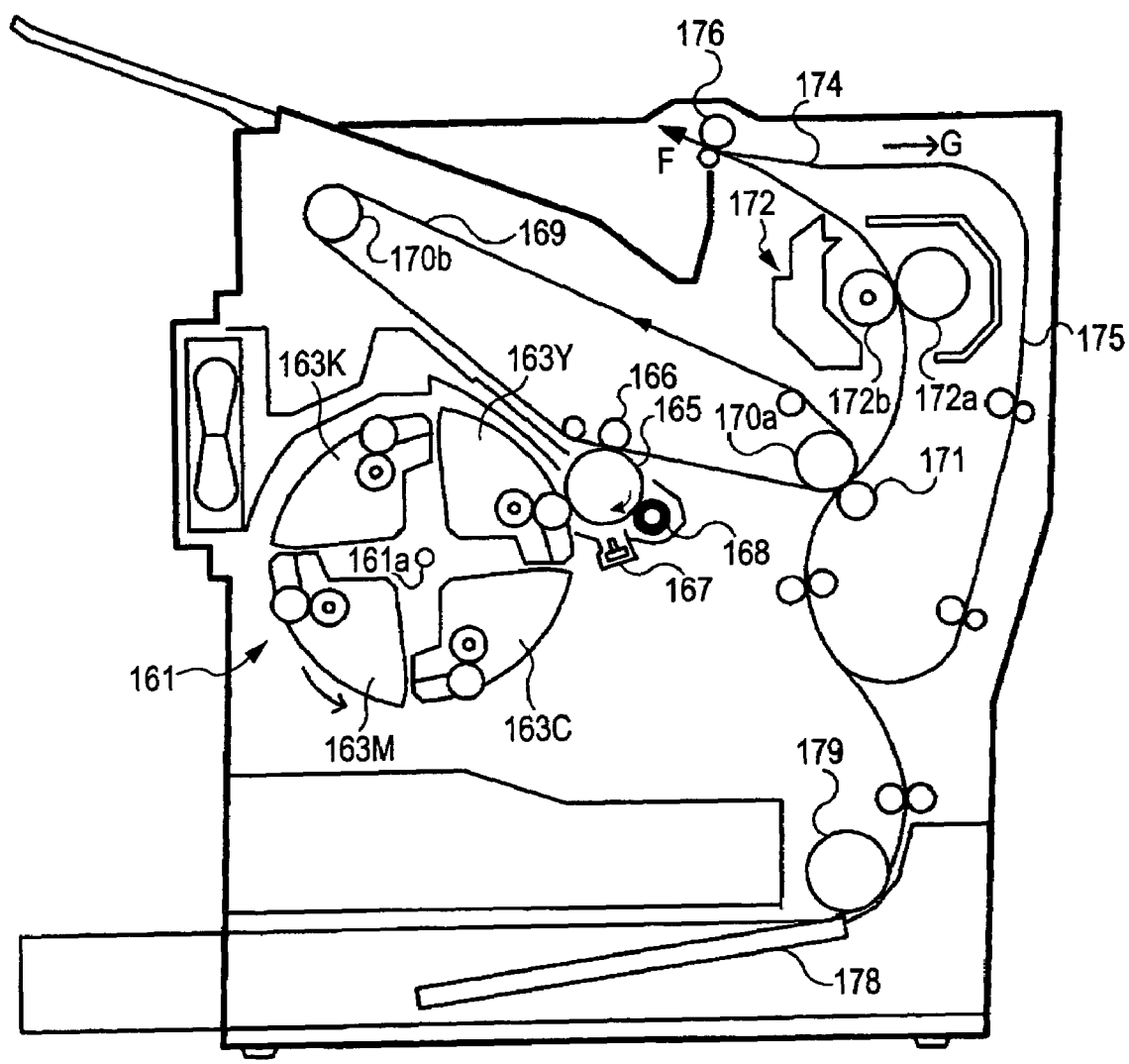
FIG. 33 is a longitudinal sectional view illustrating another example of the image printing apparatus using the electro-optical device according to any one of the first to fifth embodiments of the invention.

FIG. 33 is a longitudinal cross-sectional view illustrating another image printing apparatus using any one of the electro-optical devices according to this embodiment as a linear optical head. This image printing apparatus is a rotary-development-type color image printing apparatus using a belt intermediate transfer method. In the image printing apparatus shown in FIG. 33, a corona charger 168, a rotary developing unit 161, an organic EL array exposure head 167, and an intermediate transfer belt 169 are provided around a photosensitive drum (an image carrier) 165.

The corona charger 168 uniformly charges the outer peripheral surface of the photosensitive drum 165. The organic EL array exposure head 167 writes an electrostatic latent image on the charged outer peripheral surface of the photosensitive drum 165. The organic EL array exposure head 167 is any one of the electro-optical devices according to the above-mentioned embodiment and is arranged in such a manner that a plurality of OLED elements 14 is arranged along a bus (in the main scanning direction) of the photosensitive drum 165. The writing of the electrostatic latent image is performed by radiating light emitted from the plurality of OLED elements 14 on the photosensitive drum.

The developing unit 161 is a drum including four developing devices 163Y, 163C, 163M, and 163K arranged at right angles to each other, and can be rotated on a shaft 161a in the counterclockwise direction. The developing devices 163Y, 163C, 163M, and 163K supply yellow, cyan, magenta, and black toners to the photosensitive drum 165 to attach the toners as a developer onto the electrostatic latent image, thereby forming a toner image, that is, a visible image on the photosensitive drum 165.

The endless intermediate transfer belt 169 is wound around a driving roller 170a, a driven roller 170b, a primary transfer roller 166, and a tension roller, and circulates around these rollers in the direction of arrow shown in FIG. 33. The primary transfer roller 166 electrostatically attracts the toner image from the photosensitive drum 165 to transfer the toner image onto the intermediate transfer belt 169 passing between the photosensitive drum and the primary transfer roller 166.

More specifically, at the first rotation of the photosensitive drum 165, an electrostatic latent image for a yellow (Y) image is written by the exposure head 167, and a toner image having the same color is formed by the developing device 163Y and is then transferred onto the intermediate transfer belt 169. At the next rotation thereof, an electrostatic latent image for a cyan (C) image is written by the exposure head 167, and a toner image having the same color is formed by the developing device 163C and is then transferred onto the intermediate transfer belt 169 so as to overlap the yellow toner image. When the photosensitive drum 169 makes four rotations in this way, yellow, cyan, magenta, and black toner images sequentially overlap each other on the intermediate transfer belt 469, so that a full-color toner image is transferred onto the intermediate transfer belt 169. Finally, when images are formed on both surfaces of a sheet, which is an image forming target, a toner image having a color common to the front and rear surfaces is transferred onto the intermediate transfer belt 169, and then a toner image having the next color common to the front and rear surfaces, thereby transferring a full-color toner image on the intermediate transfer belt 169.

A sheet transfer path 174 through which a sheet passes is provided in the image printing apparatus. The sheets are fed one by one from the paper feed cassette 178 by the pick-up roller 179 and are then transferred along the sheet transfer path 174 by a transfer roller. Then, the sheets pass through a nip between a secondary transfer roller and the intermediate transfer belt 169 coming into contact with the driving roller 170a. The secondary transfer roller 171 collectively and electrostatically attracts the full-color toner image from the intermediate transfer belt 169 to transfer the toner image onto one surface of the sheet. The secondary transfer roller 171 approaches or is separated from the intermediate transfer belt 169 by a clutch (not shown). When a full-color toner image is transferred onto a sheet, the secondary transfer roller 171 abuts on the intermediate transfer belt 169. On the other hand, when the toner images overlap the intermediate transfer belt 169, the secondary transfer roller 171 is separated therefrom.

In this way, the sheet having an image thereon is transferred to a fixing device 172 and passes between a heating roller 172a and a pressing roller 172b of the fixing device 172, thereby fixing a toner image on the sheet. The sheet having the fixed toner image is transferred to the pair of paper discharge rollers 176 to be carried in the direction of arrow F. When printing is performed on both sides of a sheet, after most of the sheet passes through the paper discharge rollers 176, the pair of paper discharge rollers 176 is reversely rotated to transfer the sheet in a double-sided printing transfer path 175 as represented by an arrow G. Subsequently, a toner image is transferred onto the other surface of the sheet by the secondary transfer roller 171, and is then fixed by the fixing device 172. Then, the sheet is discharged to the outside by the pair of paper discharge rollers 176.

The image printing apparatus shown in FIG. 33 uses the exposure head 167 (any one of the electro-optical devices according to the above-mentioned embodiment) having an organic EL array as a writing unit, which makes it possible to improve the usage efficiency of light.

The image printing apparatus capable of using any one of the electro-optical devices according to the above-mentioned embodiment has been described as an example. However, any one of the electro-optical devices according to the above-mentioned embodiment can be applied to image printing apparatuses adopting other electrophotography methods, and these image printing apparatuses can be also included in the scope of the invention. For example, the electro-optical devices according to invention can be applied to an image printing apparatus which directly transfers a toner image on a photosensitive drum without using the intermediate transfer belt and an image printing apparatus capable of forming monochrome images.

Applications

The electro-optical device according to the invention can be applied to various exposure devices and illuminating devices.

In the light-emitting panel of the above-mentioned electro-optical device, OLED elements are used as light-emitting element for converting electrical energy into optical energy. However, other light-emitting elements (for example, inorganic EL elements or plasma display elements) may be used for the light-emitting panel. In addition, a bottom-emission-type light-emitting panel may be used. In the bottom-emission-type light-emitting panel, light is emitted from the light-emitting elements to the outside through a transparent substrate. The spacer unit may be arranged between the substrate and the converging lens array.

Further, in the above-mentioned electro-optical device, the converging lens array 40 is attached to the light-emitting panel having light-emitting element therein. However, the converging lens array may be attached to a light value panel having a plurality of light value pixels therein. The light value pixels change the transmittance of light by electrical energy supplied, and include pixels of a liquid crystal display device, pixels of an electro-luminescent display device, pixels of an electrophoresis display device, and pixels of a dispersed-particle-alignment-type display device.

These pixels adjust the transmission amount of light emitted from an individual light source. Instead of the light-emitting panel 12, for example, a light value panel, such as a light crystal panel, may be attached to a micro lens array so that light emitted from an individual light source passes through the light value panel and the converging lens array. This electro-optical device can be used for a projector for projecting images onto a screen, in addition to the image printing apparatuses shown in FIGS. 32 and 33.

What is claimed is:

1. An electro-optical device comprising:
   an electro-optical panel which has a plurality of electro-optical elements whose light-emitting characteristics or transmissive characteristics are changed by electrical energy applied;
   a converging lens array which has a plurality of distributed index lenses, each transmitting light traveling from the electro-optical panel to form an erect image with respect to an image on the electro-optical panel, the images formed by the plurality of distributed index lenses constituting a continuous image; and
   a transmissive spacer unit which is provided between the electro-optical panel and the converging lens array so as to be bonded to them,
   wherein the spacer unit includes a laminated structure of a plurality of transmissive spacer members.

2. The electro-optical device according to claim 1,
   wherein the spacer unit has light absorbing layers formed on surfaces thereof not facing the electro-optical panel and the converging lens array.

3. The electro-optical device according to claim 1,
   wherein the spacer unit is provided with a receiving hole into which a transparent adhesive for adhering at least one of the electro-optical panel and the converging lens array to the spacer member is filled.

4. The electro-optical device according to claim 3,
   wherein at least one of the electro-optical panel and the converging lens array is fitted into the receiving hole.

5. The electro-optical device according to claim 3,
   wherein concave portions into which the adhesive flows from the bottom of the receiving hole are formed in a side surface of the receiving hole of the spacer unit.

6. The electro-optical device according to claim 1,
   wherein grooves into which a transparent adhesive for adhering at least one of the electro-optical panel and the converging lens array to the spacer unit flows are formed in a surface of the spacer unit facing at least one of the electro-optical panel and the converging lens array.

7. The electro-optical device according to claim 1,
   wherein, when the refractive index of each transmissive element provided between electro-optical elements of the electro-optical panel and the converging lens array is $n_i$, the thickness of each transmissive element is $d_i$, the number of transmissive elements is m, and an object distance of the converging lens array to the electro-optical panel in the air is Lo, the following expression 1 is satisfied:

[Expression 1]

$$0.9 \times \sum_{i=1}^{m} \frac{d_i}{n_i} \leq L_o \leq 1.1 \times \sum_{i=1}^{m} \frac{d_i}{n_i} \tag{1}$$

8. An image printing apparatus comprising:

image carriers;

charging devices that charge the image carriers;

the electro-optical device according to claim 1 that radiates light emitted from the electro-optical panel to the converging lens array onto charged surfaces of the image carriers to form latent images thereon;

developing devices that attach a toner on the latent images to form toner images on the image carriers; and a transfer device that transfers the toner images from the image carriers to another object.

9. A method of manufacturing the electro-optical device according to claim 1, comprising:

laminating a plurality of spacer members such that the spacer members are bonded to each other;

bonding any one of the spacer members to the electro-optical panel; and bonding another member of the spacer members to the converging lens array.

10. The method of manufacturing an electro-optical device according to claim 9, further comprising:

measuring an actual object distance $L_o$ of the converging lens array to the electro-optical panel in the air; and calculating the thickness of the spacer unit to be used, on the basis of the object distance $L_o$ and the refractive indexes of the spacer members, so as to satisfy the expression 1.

* * * * *